United States Patent [19]
Onishi et al.

[11] Patent Number: 5,967,467
[45] Date of Patent: Oct. 19, 1999

[54] FIXTURE FOR USE IN ELECTRIC LINE INSTALLATION

[76] Inventors: Yoshio Onishi, 31-19, Ageo-cho 2-chome, Yao-shi, Osaka 581; Masakatsu Onishi, 1881-45, Kanaoka-cho, Sakai-shi Osaka 591, both of Japan

[21] Appl. No.: 08/845,081

[22] Filed: Apr. 18, 1997

Related U.S. Application Data

[62] Division of application No. 08/537,723, Oct. 11, 1995, Pat. No. 5,769,365.

[30] Foreign Application Priority Data

| Mar. 29, 1994 | [JP] | Japan | 6-82320 |
| Mar. 29, 1994 | [JP] | Japan | 6-82329 |
| Sep. 12, 1994 | [JP] | Japan | 6-331914 |

[51] Int. Cl.⁶ .................................................. F16L 3/00
[52] U.S. Cl. ........................... 248/49; 248/58; 248/68.1; 248/223.41; 411/84; 411/182
[58] Field of Search .......................... 248/58, 49, 68.1, 248/73, 74.1, 222.11, 222.12, 222.14, 223.41, 228.2, 500; 411/182, 84, 85, 508, 509

[56] References Cited

U.S. PATENT DOCUMENTS

| 2,880,949 | 4/1959 | Fuss | 248/73 X |
| 3,705,442 | 12/1972 | Sygnator | 411/508 X |
| 4,662,590 | 5/1987 | Hungerford, Jr. | 248/73 X |
| 4,789,286 | 12/1988 | Laput | 411/84 |
| 4,830,531 | 5/1989 | Condit et al. | 411/85 X |
| 5,372,341 | 12/1994 | Witherbee et al. | 248/49 |

FOREIGN PATENT DOCUMENTS 553765  8/1993  European Pat. Off. .

*Primary Examiner*—Derek J. Berger
*Attorney, Agent, or Firm*—Michael J. Striker

[57] ABSTRACT

It is an object to provide a fixture which enables ready, accurate and positive preliminary mounting of an electric line part in completely one operation without the need for any screwing operation, regardless of a change in the width and height of the channel flanges of a channel rail and also, enables ready and positive permanent securement of the electric line part, and which allows an operator to extremely easily, positively and efficiently carry out this type of operation without the need for any skill.

A means for clamping electric line parts according to the present invention comprises a fixture body 1 having a part attached to a channel rail 4, a bolt 2, and a clamp 3 threadedly engaged with the bolt 2. The clamp 3 includes a central nut 3B, pivot pins 8, 8 mounted to the nut 3B, a pair of right and left clamping elements 3A, 3A pivotable about the horizontal pivot pins 8, 8, and a protrusion 8a extending outwardly from one side of the nut 3B. The fixture body has a guide plate 122 at a location where the fixture body is attached to the channel rail 4. The protrusion 8a is guidably received in a guide slot 124 of the guide plate 122.

7 Claims, 18 Drawing Sheets

Fig. 11-A
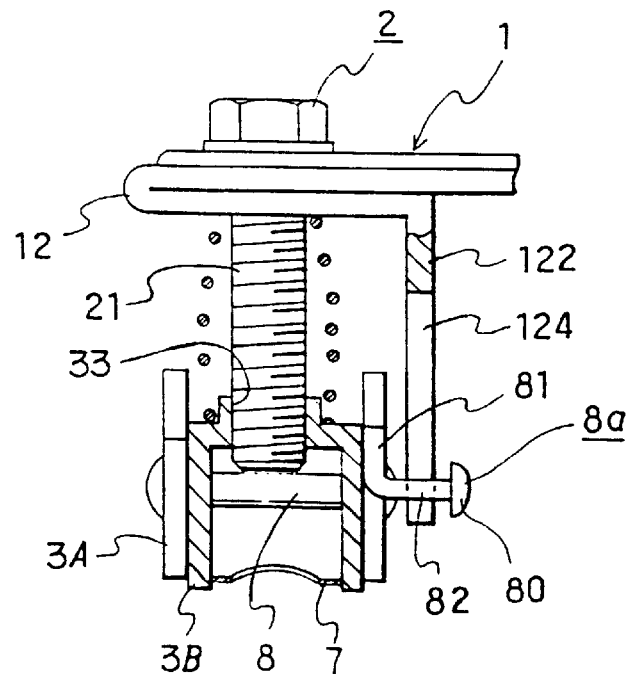
Fig. 11-B
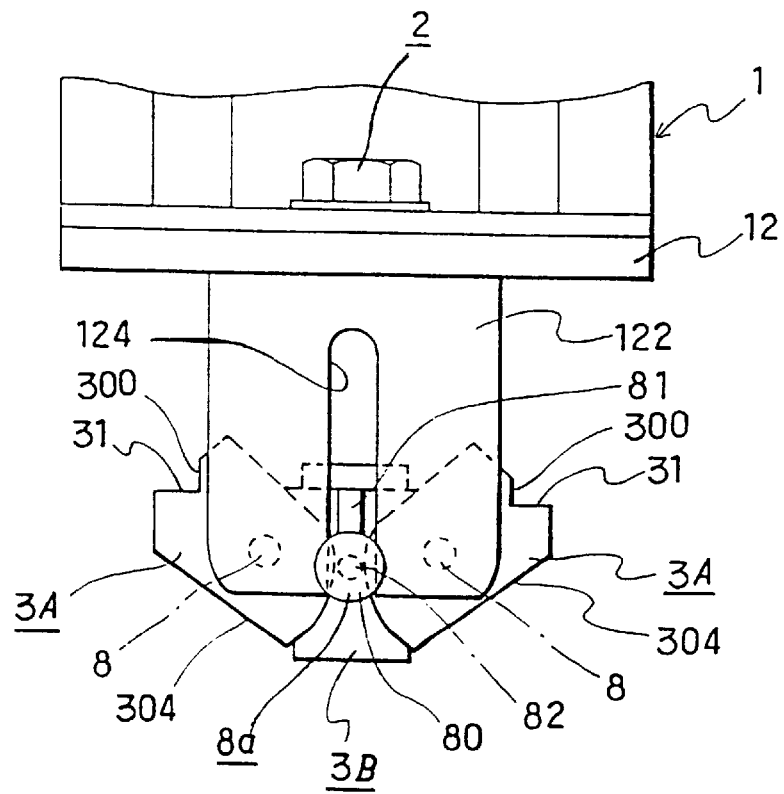

Fig. 12-A
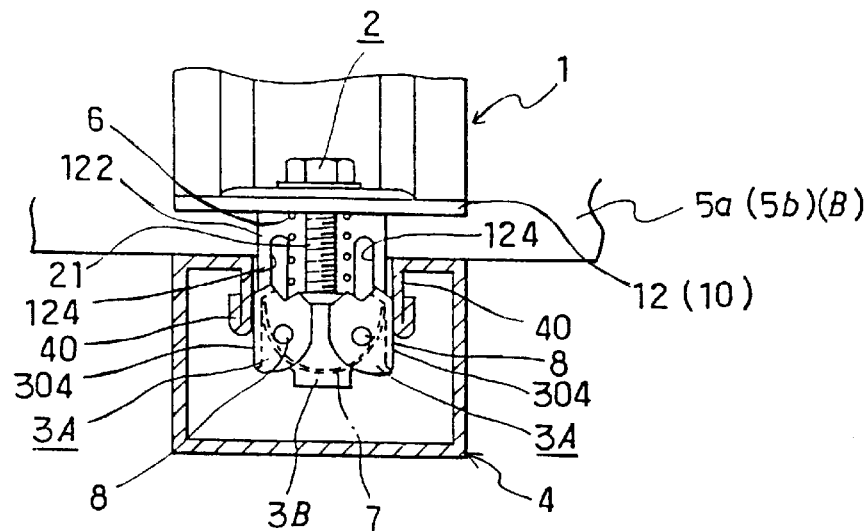
Fig. 12-B
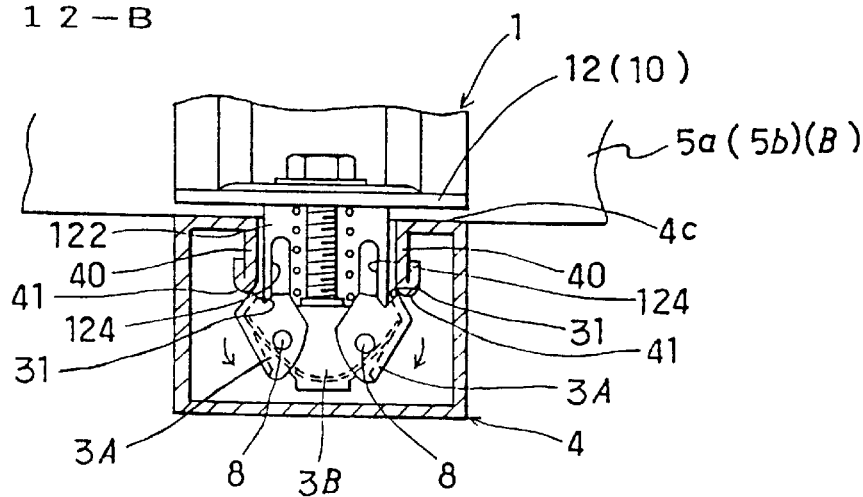
Fig. 12-C
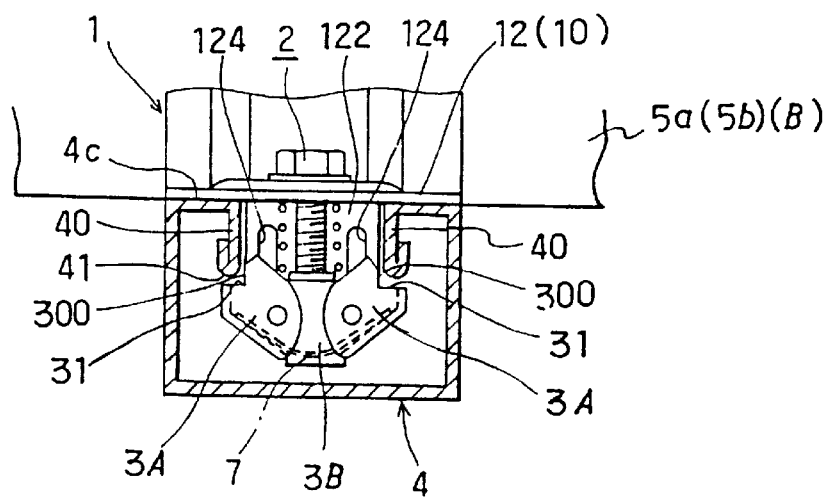

Fig. 13-A
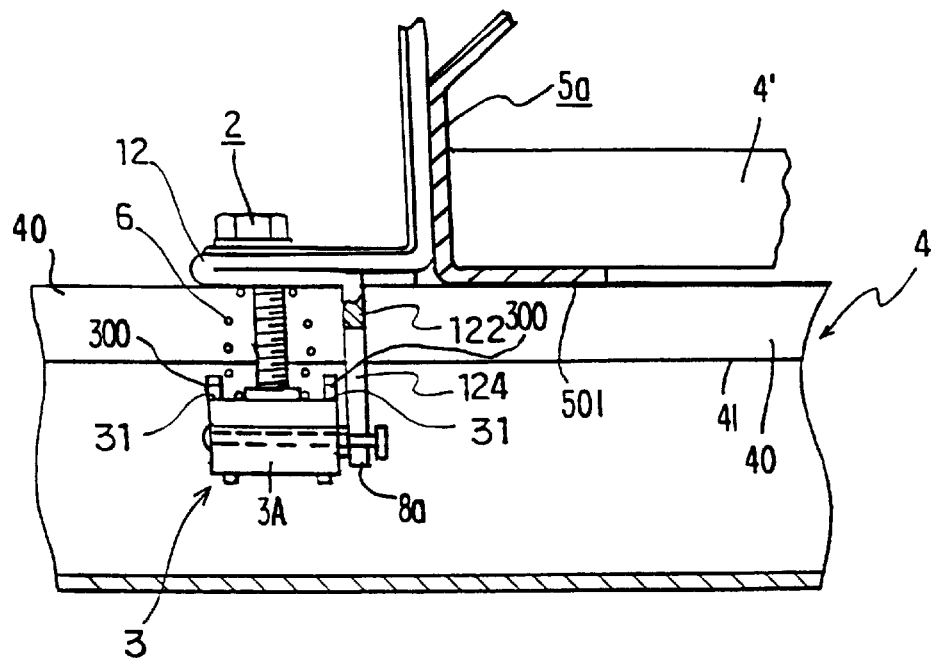
Fig. 13-B
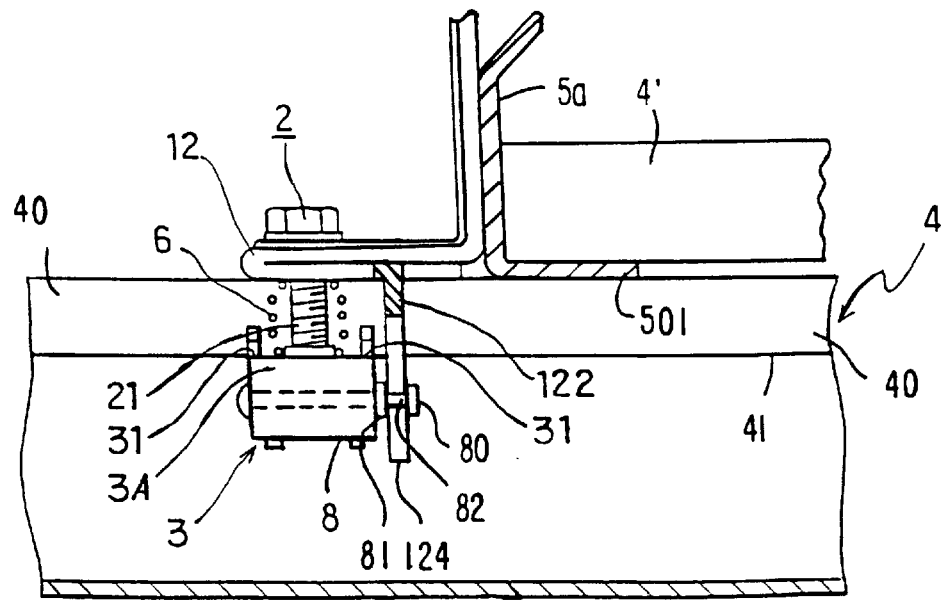

Fig. 17-A
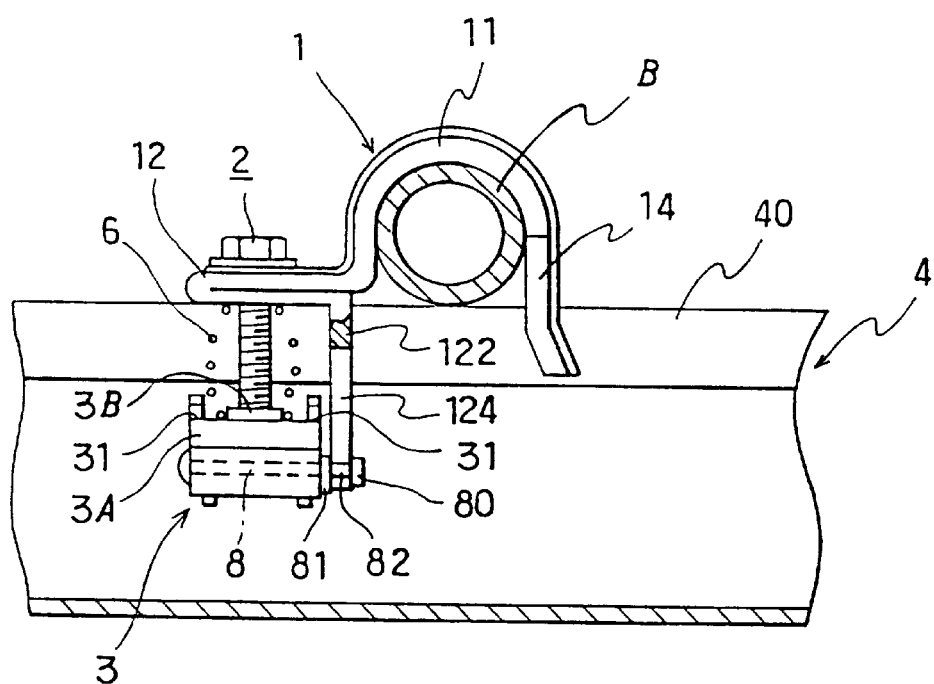
Fig. 17-B
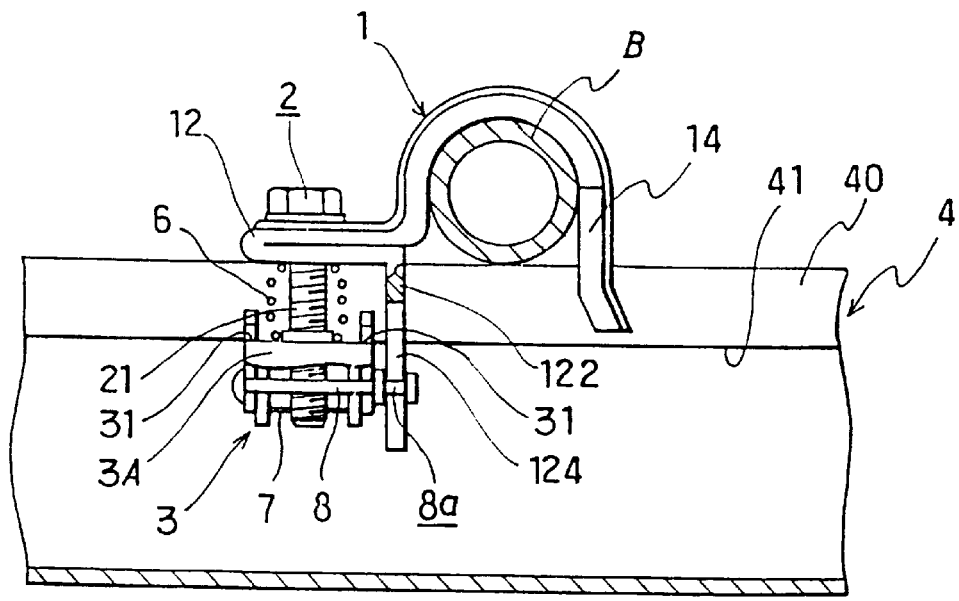

Fig. 24-A
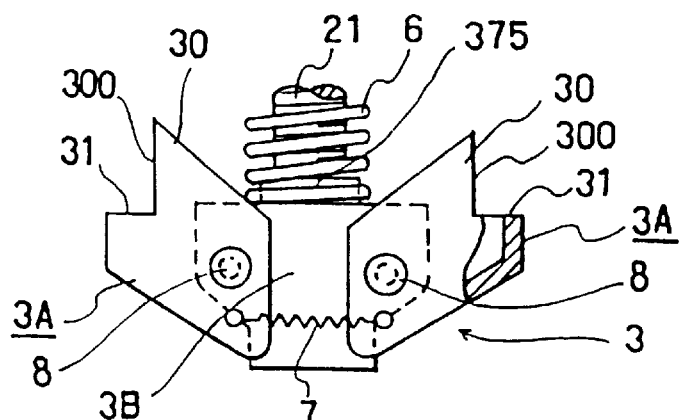
Fig. 24-B
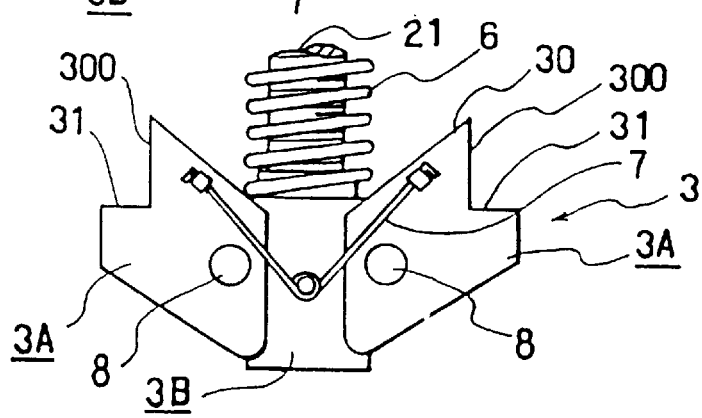

FIXTURE FOR USE IN ELECTRIC LINE INSTALLATION

This is a division of application Ser. No. 08/537,723 filed Oct. 11, 1995 now U.S. Pat. No. 5,769,365.

TECHNICAL FIELD

The present invention relates to a fixture for use in electric line installation.

BACKGROUND ART

It is necessary to install a power cable, a telecommunication cable or other cables, and pipes (cable tubes) through which those cables pass from a vertical zone (vertical direction) to a ceiling zone (horizontal direction) in various buildings such as a factory, a business office, a store, a condominium, a warehouse, a station, a gymnasium and a theater as well as in various structures such as a tunnel, a subway, an elevated railway, an elevated road, and a bridge.

In such a ceiling zone, hanger bolts are mounted to the ceiling at fixed intervals to hold channel rails. Racks are placed on and extend across the channel rails to guidably support cables or cable tubes. The racks are then secured to the channel rails. As an alternative, the cable tubes are directly placed on and extend across the channel rails held by the hanger bolts. The cable tubes are then secured to the channel rails. The channel rail may be directly secured to the ceiling with its opening (slot) being directed downward.

In the vertical zone, the channel rails are secured to structural beams, girders or walls at fixed intervals and extend in a horizontal direction. The racks or cable tubes extend across and are secured to the channel rails.

The channel rail is also referred to as a "hanger rail", "duct channel, or "raceway". In either case, the racks and cable tubes must be secured to each channel rail at points where the racks and cable tubes intersect with each channel rail. A number of securing operations are thus required to complete the installation. A substantial number of securing operations are involved where it is necessary to secure small girders or partitions to the racks, or to secure outlet boxes or other electric devices or components to the channel rails.

To this end, there has been proposed a fixture for securing racks as disclosed in Japanese utility model publication No. 5-19671. The prior art fixture comprises a fixture body having a through opening at a location where the fixture body is attached to a channel rail, a bolt extending through the through opening, and a rectangular slat including a central, internally threaded hole adapted to receive the bolt. The slat has a pair of long sides and a pair of short sides. The long side has a length equal to or greater than the distance between flanges of the channel rail. Diagonally opposite corners of the slat are cut in an oblique fashion. A spring is disposed between the fixture body and the head of the bolt to thereby lift the bolt and the slat.

However, the prior art fixture presents the following problems.

(1) The slat is substantially long and has a length greater than the width of the fixture body. Handling of such a large slat is cumbersome. The orientation of the slat must be adjusted if a change in the orientation of the slat occurs due to contact with hands or articles prior to use.

(2) Preliminary mounting requires two steps, one step of axially pressing the bolt to move the slat below the channel flanges of the channel rail, and the other step of rotating the bolt by 90 degrees to swing the slat in a direction perpendicular to the channel rail. These operations are cumbersome. Also, an operator is subject to fatigue since his wrists are repeatedly twisted.

(3) Preliminary mounting requires a screwing operation. If the bolt is inadvertently rotated in a counterclockwise direction, the slat is disengaged from the bolt and may drop in the channel rail. Removal of the bolt requires substantial effort and time and thus deteriorates efficiency. Also, where the channel rail has a downwardly directed opening, the operator is subject to injury if the slat and articles are disengaged from the bolt and the fixture body and hit the operator's head and face.

(4) Rotation of the slat is limited when the longitudinal front end of the slat is contacted with the inner walls of the flanges. The slat may not be oriented at right angles to or may be obliquely engaged with the channel rail, depending on the configuration of the inner flange walls. This retards rotation of the bolt and causes the slat to be raised in an oblique fashion. If this occurs, the slat can not firmly be secured to the channel rail since a sufficient clamping area between the end surfaces of the downwardly directed rail walls and the slat is not available.

To this end, the inventors of the present application proposed a fixture for securing cable tubes as disclosed in EP 0553 765 A1.

The prior art fixture comprises a fixture body, a bolt extending through the fixture body, and a clamp threadedly engaged with the bolt. The clamp includes a central nut, and a pair of right and left clamping elements pivotably mounted to the nut and pivotable about a horizontal axis. Each clamping element has a clamping surface engageable with the lower surfaces of channel flanges, and stop surfaces extending upwardly from the clamping surface and contacted between the channel flanges. A spring is disposed between the head of the bolt and the fixture body to lift the clamp and the bolt. The fixture body has opposite side walls adapted to clamp the stop surfaces of the right and left clamping elements to hold the clamp relative to the fixture body.

In the prior art, electric line parts can be preliminarily mounted by axially pushing the bolt.

A problem with the prior art is that since the bolt constantly extends upwardly from the fixture body, external force may cause inadvertent operation of the clamp. Another problem is that the clamp is susceptible to displacement if the side walls of the fixture body are not equal to the distance between the stopper surfaces of the clamping elements. As to the latter problem, a clamping force is barely created if a space is left between the opposite side walls and the stop surfaces. In such a case, the clamp is likely to be displaced prior to use. If the bolt is pushed while the clamp is displaced, the clamp is inserted in an oblique fashion into the opening of the channel rail. On the other hand, an excess amount of clamping force is created when the distance between the opposite side walls is too short. If this occurs, assemblage becomes cumbersome. Also, the clamp may not be lowered even if the bolt is strongly pushed.

In the prior art, the stop surfaces of the clamping elements are snugly fit within the channel flanges of the channel rail. This arrangement insures lifting of the clamp and prevents rotation of the clamp about a vertical axis during a clamping operation.

The distance between the channel flanges of the channel rail to be secured has effect on vertical upward motion of the clamp and rotation of the clamp about a vertical axis. A problem also arises when the height of the channel flanges differ from each other, or when the clamp is not appropriately positioned relative to the bolt even if the channel opening has a required width. In other words, the stop surfaces are undesirably moved below the lower ends of the channel flanges to cause pivotal motion of the clamp about a vertical axis during a clamping operation. This makes it difficult to orient the clamp at right angles to the channel flanges. To this end, it is conventionally necessary to prepare various types of clamps to accommodate various types and sizes of channel rails to be secured. Also, it is necessary to carefully mount the clamp to the bolt during assembly of the fixture.

SUMMARY OF THE INVENTION

It is an object of the present invention to provide a fixture which enables ready, accurate and positive preliminary mounting of electric line parts in completely one operation without the need for any screwing operation, regardless of a change in the width and height of channel flanges of a channel rail and also, enables ready and positive subsequent permanent securement, and which allows an operator to extremely easily and positively carry out this type of operation without the need for any skill.

It is a further object of the present invention to provide a fixture for installing electric lines, which allows for strong clamping of electric lines parts.

According to the present invention, "electric line parts" include a rack, a main girder, a small girder or other girders, a partition or other separators, an outlet box or other devices, a cable, a cable tube or similar tubes of various shapes and structures for securement to a channel rail during electric line installation.

In order to achieve the foregoing objects, a fixture according to the primary feature of the present invention comprises a fixture body having a through opening at a location where the fixture body is attached to a channel rail, a bolt extending through the through opening, and a clamp threadedly engaged with the bolt.

The fixture body includes a guide plate having a length such that it may be inserted into the channel inlet of the channel rail. The guide plate has a vertical guide slot.

The clamp includes a central nut, pivot pins mounted to the nut, and a pair of right and left clamping elements pivotable about the horizontal pivot pins. Each of the clamping elements has a clamping surface and guide surfaces extending upwardly from the clamping surface. The clamp also has a protrusion extending outwardly from one side of the nut and fit within the guide slot of the guide plate.

According to this primary feature, the guide plate is integral with the fixture body. In this case, the guide plate is bent from and oriented at right angles or near right angles to the front end of a portion (seating portion or main portion) of the fixture body attached to the channel rail. Alternatively, the guide plate may be bent from and oriented at right angles or near right angles to the lower plate of the fixture body which is turned rearwardly from the front end of a portion of the fixture body attached to the channel rail.

According to a second feature of the present invention, there is provided a combination of a fixture body and an auxiliary fixture body. The fixture body has a through opening at a location where the fixture body is attached to a channel rail.

The auxiliary fixture body has a plate superimposed on a portion of the fixture body which is attached to the channel rail. A guide plate is connected to the plate and has a length such that the guide plate may be inserted into the channel inlet of the channel rail. The guide plate has a vertical guide slot.

The clamp has a protrusion extending outwardly from one side of the nut and fit within the guide slot in the auxiliary fixture body.

According to either of the primary and second features, two guide slots preferably extend parallel to two respective protrusions although there may be provided a single guide slot and a single protrusion. The two protrusions are preferably integral with the pivot pins.

The fixture body is classified into two different types. One type of fixture body is independent of an electric line part and includes a clamping portion for clamping the electric line part. The other type of fixture body is integral with an electric line part. The former is used to secure electric line parts such as a main girder, a small girder, a partition, a cable tube or similar tubes, and a cable or the like. The latter is used to secure electric line parts such as an outlet box or other devices.

Not only a single clamp, but a plurality of clamps may be mounted to the fixture body. The clamp, even if the right and left clamping elements are fully opened, has a length less than the width of the channel inlet of the channel rail. Preferably, the clamp includes a return element adapted to move the clamping elements automatically from their closed condition to opened condition. Also, the clamp preferably includes a retainer adapted to retain the nut at a distance from the fixture body or auxiliary fixture body.

According to the present invention, the fixture body or the auxiliary fixture body includes a guide plate extending in the height direction and having a guide slot. A protrusion extending from the clamp is fit into the guide slot from the side. Accordingly, the clamp is free from vibration in a to-and-fro direction as well as lateral direction and is held such that the side of the clamp extends parallel to the guide plate.

Where the fixture body is independent of an electric line part, the electric line part is placed on a channel rail. The fixture body is then pressed against the channel rail. This completes preliminary mounting of the electric line part. Where the fixture body is integral with an electric line part, preliminary mounting is effected simply by pressing the electric line part toward the channel rail.

Thus, the guide plate and the clamp are inserted into the channel inlet of the channel rail while the guide plate and the clamp are held in an integral fashion. A biasing force is applied to the fixture body to rotate the clamping elements of the clamp in a symmetrical fashion about a horizontal axis and urge them toward each other when the clamping elements are brought into contact with channel flanges of the channel rail. The clamping elements are returned to their open condition immediately when the outer ends of the clamping elements are moved beyond the lower ends of the pair of walls.

At this time, the clamping elements are free from vibration since, according to the present invention, the protrusion which extends from the nut is fit within the guide slot of the guide plate. Thus, the clamping elements will in no way be offset from their required orientation if the guide surfaces of the clamping elements fail to contact the channel flanges. It is possible to effect preliminary mounting in completely one operation without the need to rotate or push the bolt.

Under the circumstances, the position of the fixture body on the channel rail is adjusted. The bolt is rotated after the fixture body has been positioned. The bolt is then inserted into the nut to thereby raise the nut and the clamp. At this time, the protrusion is fit within the guide slot. These elements serve as guides and hold the clamping elements such that the clamping elements are oriented at right angles to the channel rail as the clamping elements are lifted. As such, the clamping portions are moved toward and strongly pressed against the lower surfaces of a pair of walls to firmly clamp the electric line part to the channel rail if the stop surfaces of the clamping elements are spaced away from the lower surfaces of the channel flanges.

A fixture according to the present invention is suitable for any channel rail as far as a channel inlet has a width and depth such that the clamping elements can be closed and opened. Mounting of the clamp to the fixture body does not require positioning of the bolt relative to the clamp. It is also not necessary to provide a wide variety of clamps.

BRIEF DESCRIPTION OF THE DRAWINGS

FIG. 11-A is a side view, partly broken away, of the embodiment with a modified protrusion;

FIG. 11-B is a front view of the embodiment shown in FIG. 11-A;

FIGS. 12-A to 12-C are front views showing how a fixture body and a clamp are moved upon preliminary mounting to permanent securement;

FIG. 13-A is a side view, partly broken away, showing the manner of preliminary mounting by means of a fixture for securing racks according to the present invention;

FIG. 13-B is a side view, partly broken away, showing the manner of permanent securement;

FIG. 17-A is a side view, partly broken away, showing the manner of preliminary mounting by means of a fixture for securing a cable or cable tube according to the present invention;

FIG. 17-B is a side view, partly broken away, showing the manner of permanent securement;

FIG. 24-A is a front view of the clamp with a modified return element; and

FIG. 24-B is a front view of the clamp with another modified return element.

DESCRIPTION OF THE PREFERRED EMBODIMENTS OF THE INVENTION

The present invention will now be described by way of example with reference to the accompanying drawings.

Figure 1:
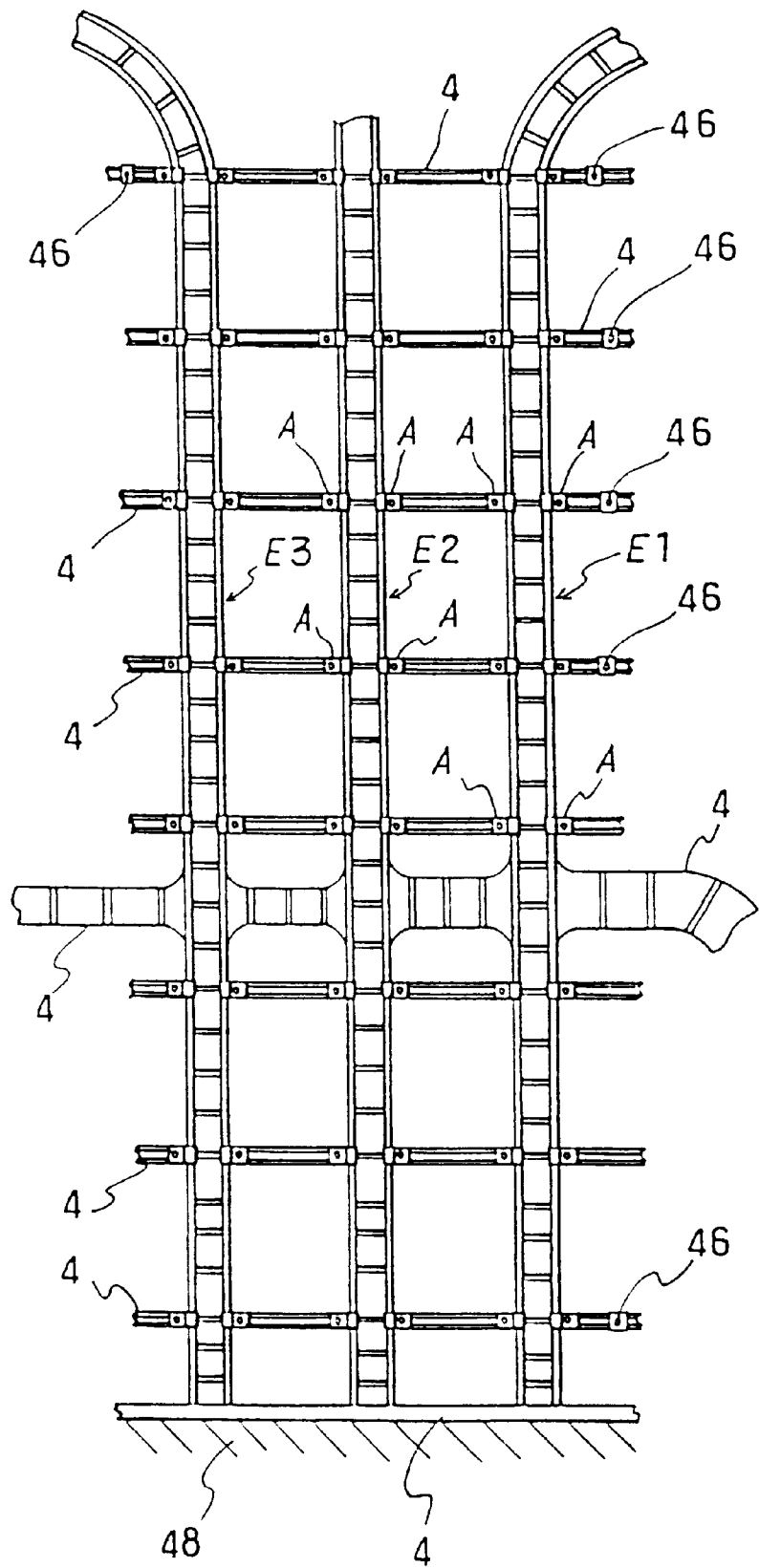
FIG. 1 is a plan view showing one example of electric lines to which the present invention is applied.
Figure 2:
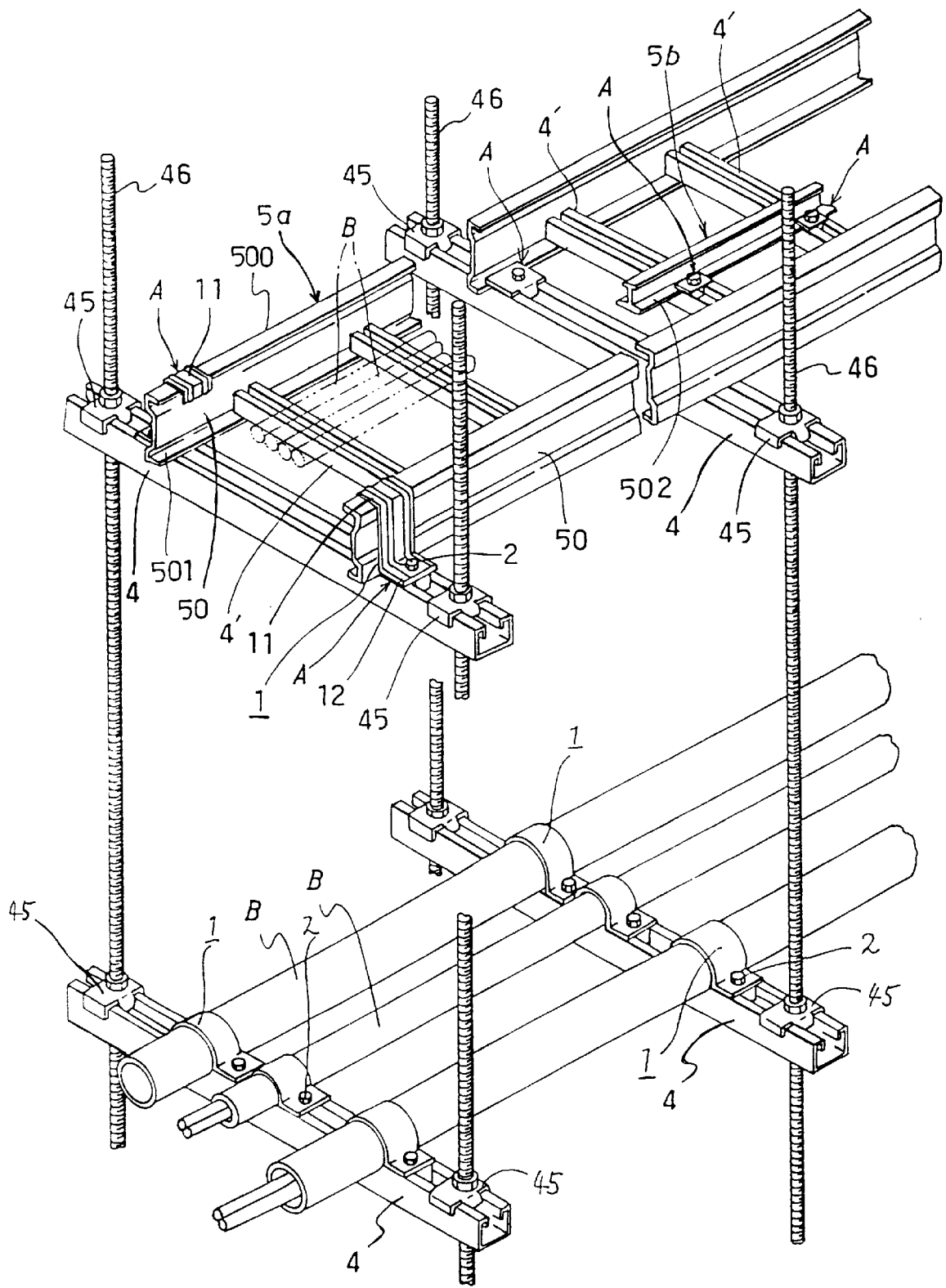
FIG. 2 is a perspective view showing one example of a fixture for installing electric lines according to the present invention.
Figure 3:
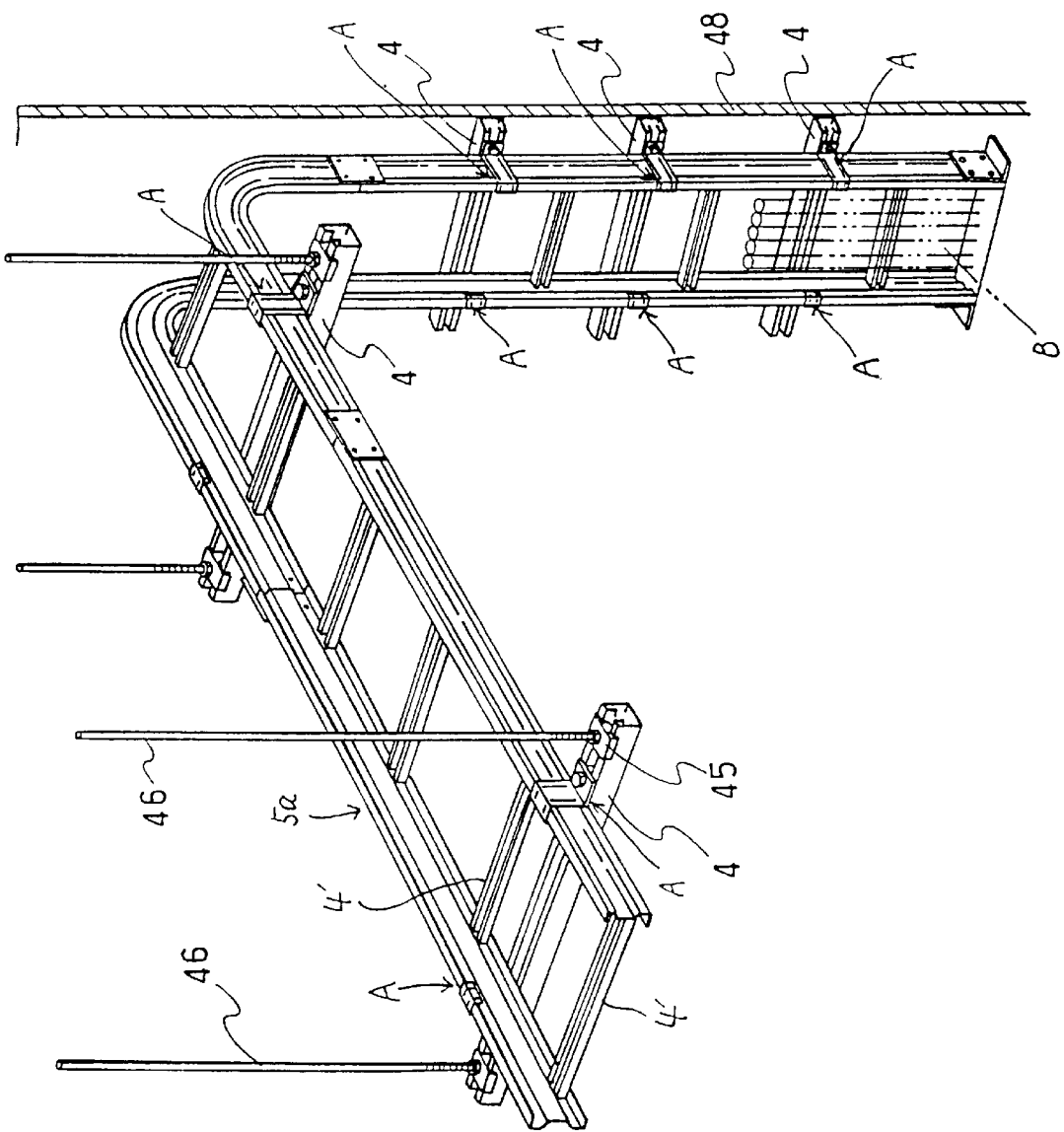
FIG. 3 is a perspective view showing another example of a fixture for installing electric lines according to the present invention.

FIGS. 1 to 3 show one example of installing electric lines by the use of fixtures according to the present invention. The reference numeral A generally designates the fixture according to the present invention. Referring to FIG. 1, there is shown three electric lines, a first electric line E1, a second electric line E2, and a third electric line E3.

4 designates a plurality of channel rails as support members. The channel rails 4 extend from a structure 48 parallel to and are spaced a predetermined distance away from each other. In a ceiling zone, the channel rails 4 are suspended by hanger bolts 46 through hanger fittings 45, as shown in FIG. 2. The hanger bolts 46 extend downwardly from the ceiling and through opposite ends of each channel rail or are arranged at given intervals along the length of the channel rail. In a vertical zone, the channel rails 4 are bolted or otherwise secured to the structure 48, as shown in FIG. 3.

5a designates racks (main girders) as electric line supports which are placed on and extend across the channel rails 4, 4. Each rack 5a may be in the form of a strip plate which is subjected to punching and has a wide C-shaped section. In this embodiment, the rack 5a includes a pair of right and left rails 50, 50 each with upper and lower flanges 500, 501, and channel rails 4' (transverse beams) extending between these rails 50, 50. The rack 5a is thus in the form of a ladder.

Referring to FIG. 2, 5b designates a small girder (partition). The small girder 5b serves to divide cables, cable tubes through which such cables extend, or fluid conduits (hereinafter, referred to as "cable or the like") on the rack 5a. The small girder 5b is in the form of a rail and has a wide, lower girder seat 502. The small girder 5b extends across the channel rails 4', 4' of the rack 5a.

In the embodiment shown in FIG. 2, the hanger bolts 46, 46 extend downward so as to support lower channel rails 4, 4. A cables or the like B extends across the lower channel rails 4, 4 and is directly secured thereto by fixtures A according to the present invention.

Each of the channel rails may be secured to the ceiling with its channel inlet directed downward and extend across the cable or the like B. It is, of course, to be understood that this arrangement falls within the scope of the present invention.

Figure 8:
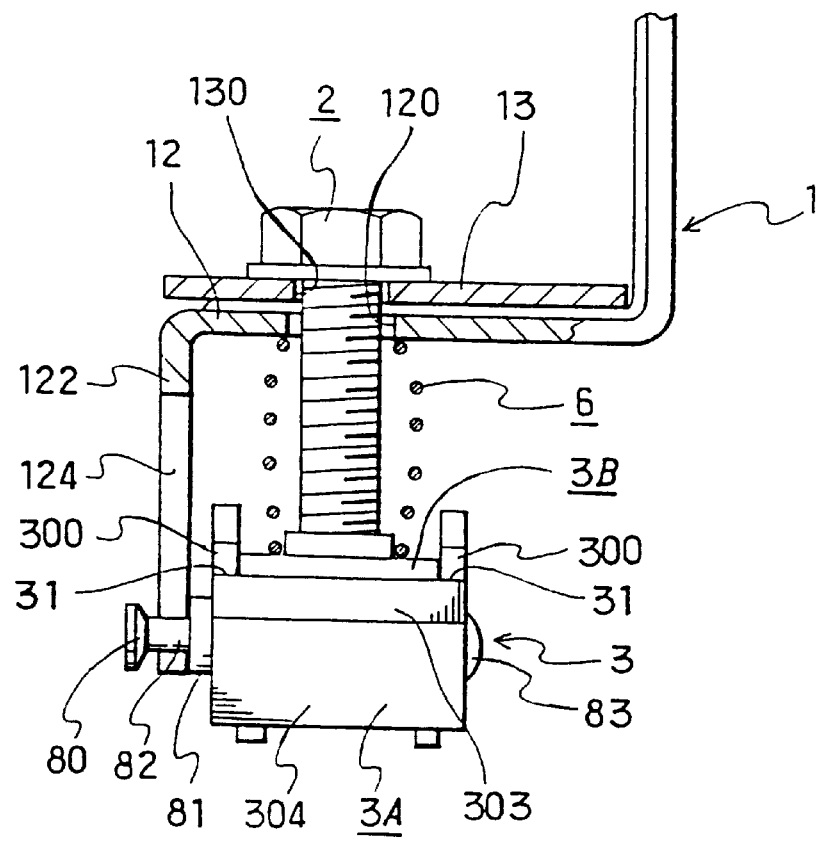
FIG. 8 is a partial side view of a second embodiment of the present invention wherein a rack is secured.
Figure 9:
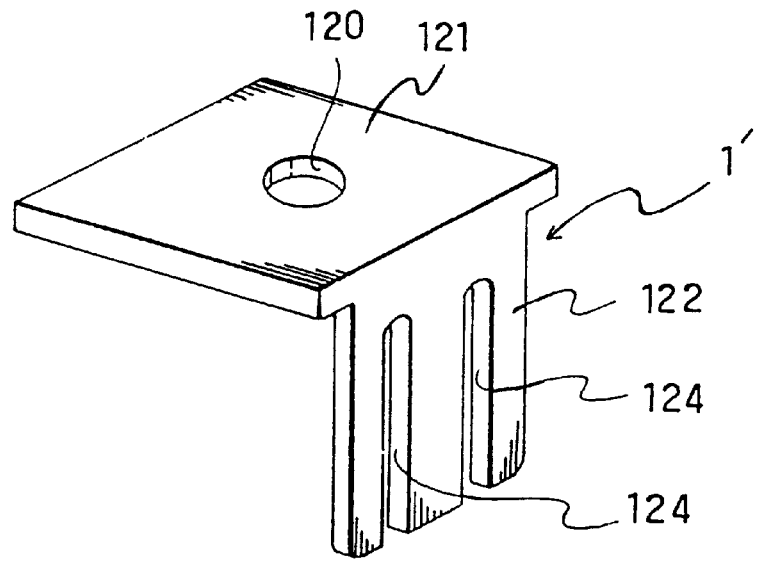
FIG. 9 is a perspective view of an auxiliary fixture body for use in the present invention.
Figure 10:
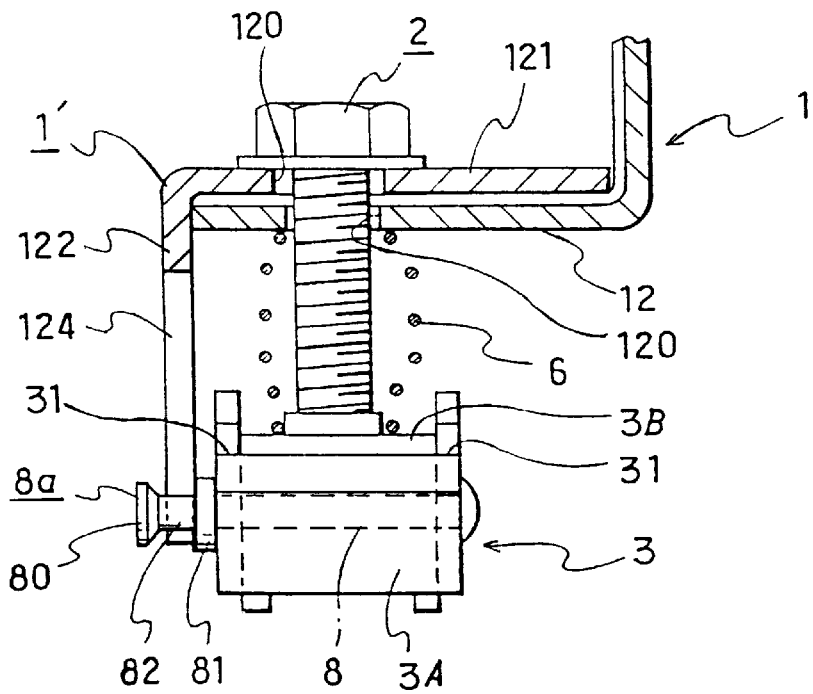
FIG. 10 is a partial side view of a third embodiment of the present invention wherein a rack is secured.

FIGS. 4 to 7 show a first embodiment (hereinafter, referred to as a "first rack related embodiment") wherein fixtures according to the first rack related embodiment are attached to the outer sides of the rack 5a to retain the rack 5a against vibration. FIG. 8 shows a second embodiment (hereinafter, referred to as a "second rack related embodiment"). FIGS. 9 and 10 show a third embodiment (hereinafter, referred to as a "third rack related embodiment"). Also, FIGS. 12-A to 12-C and FIGS. 13-A and 13-B show the manner in which preliminary mounting and permanent securement are effected by a fixture according to the first rack related embodiment.

Figure 14:
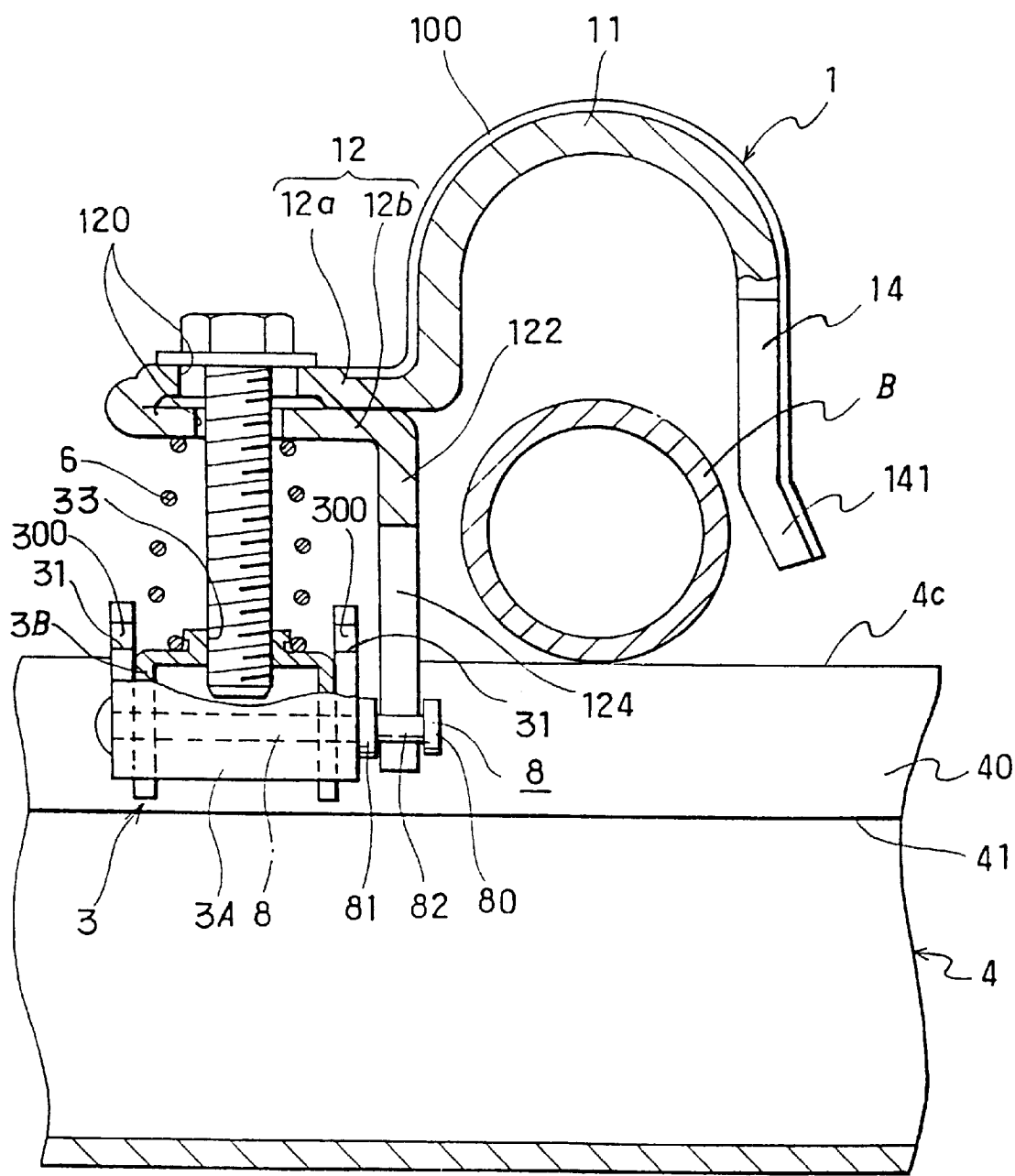
FIG. 14 is a sectional view of a fixture for securing a cable or cable tube according to a first embodiment of the present invention.
Figure 15:
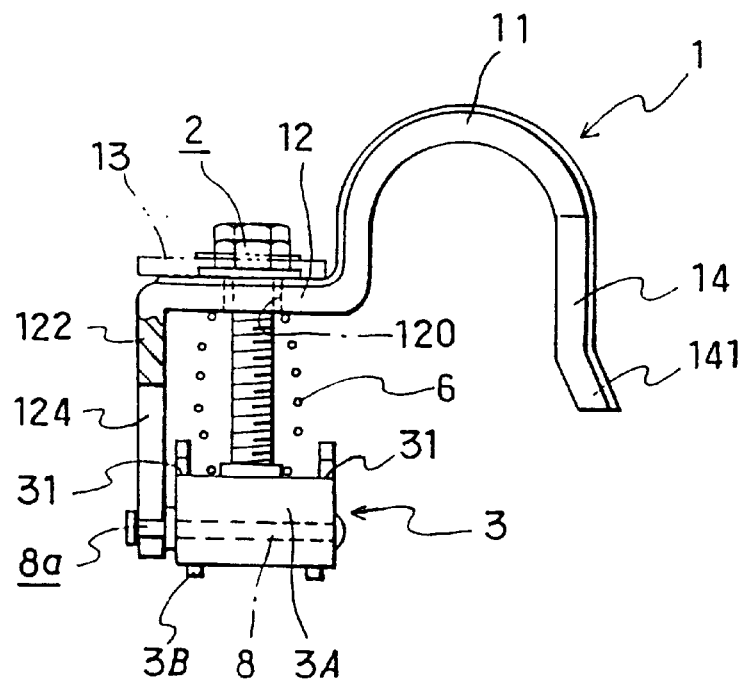
FIG. 15 is a sectional view of a fixture for securing a cable or cable tube according to a second embodiment of the present invention.
Figure 16:
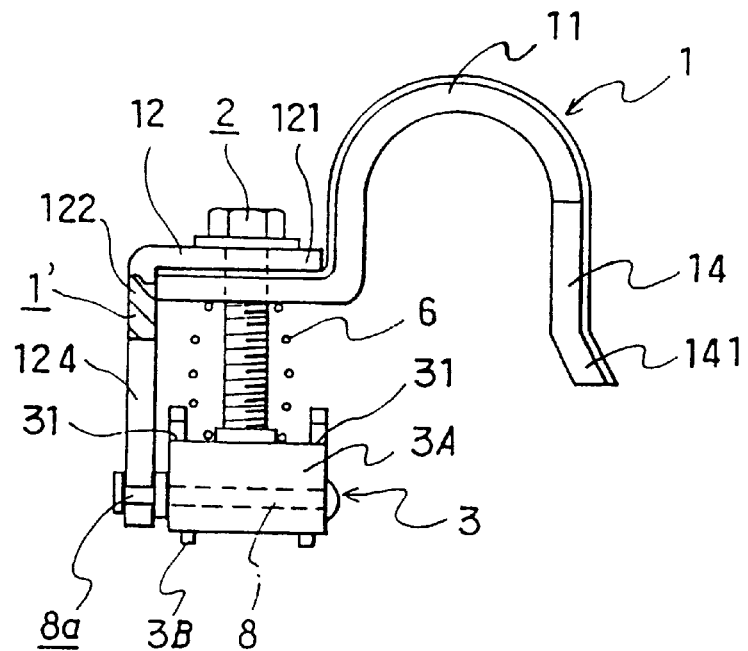
FIG. 16 is a sectional view of a fixture for securing a cable or cable tube according to a third embodiment of the present invention.
Figure 18:
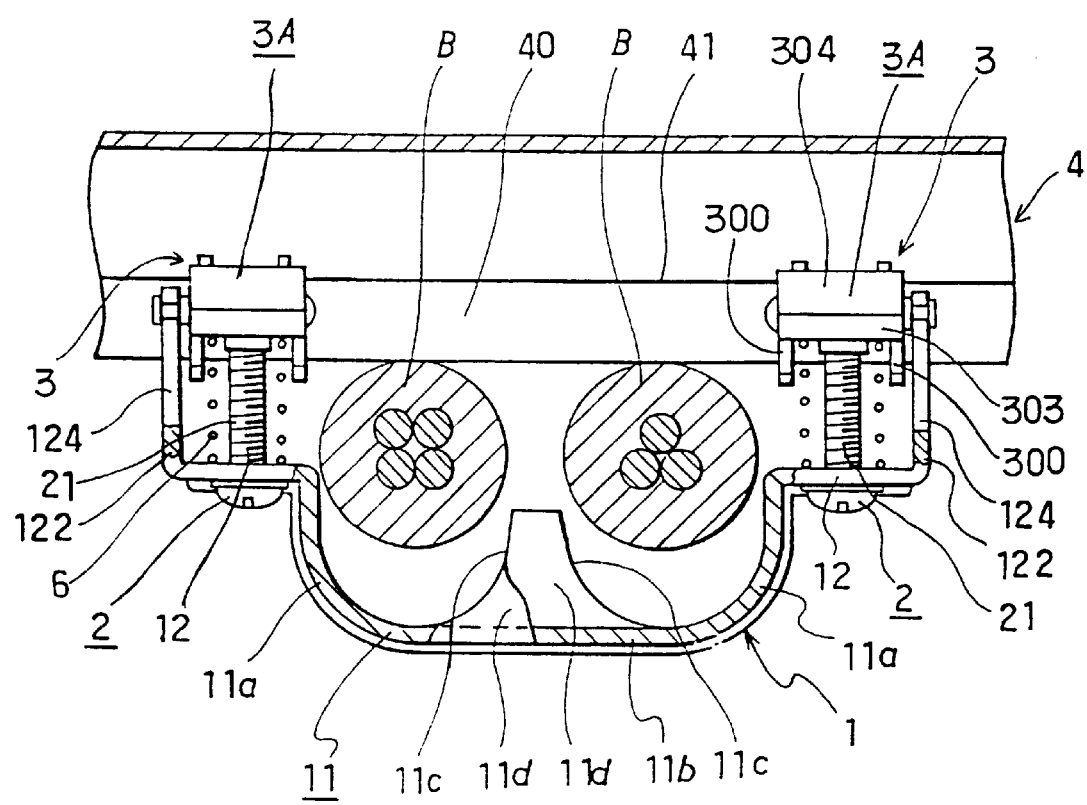
FIG. 18 is a side view, partly broken away, of a fixture for securing a cable or the like according to a fourth embodiment of the present invention.

FIG. 14 shows a first embodiment (hereinafter, referred to as a "first cable related embodiment") wherein the cable or the like B (in this particular embodiment, electric cables tubes or pipes) is secured directly to the channel rails 4, 4. FIG. 15 shows a second embodiment (hereinafter, referred to as a "second cable related embodiment"). FIG. 16 shows a third embodiment (hereinafter, referred to as a "third cable related embodiment"). FIGS. 17-A and 17-B show the manner in which preliminary mounting and permanent securement are effected by a fixture according to the first cable related embodiment. FIG. 18 shows a fourth embodiment of the present invention (hereinafter, referred to as a "fourth cable related embodiment") wherein a fixture according to the fourth cable embodiment is used to simultaneously clamp a plurality of cables or the like B, B.

Figure 19:
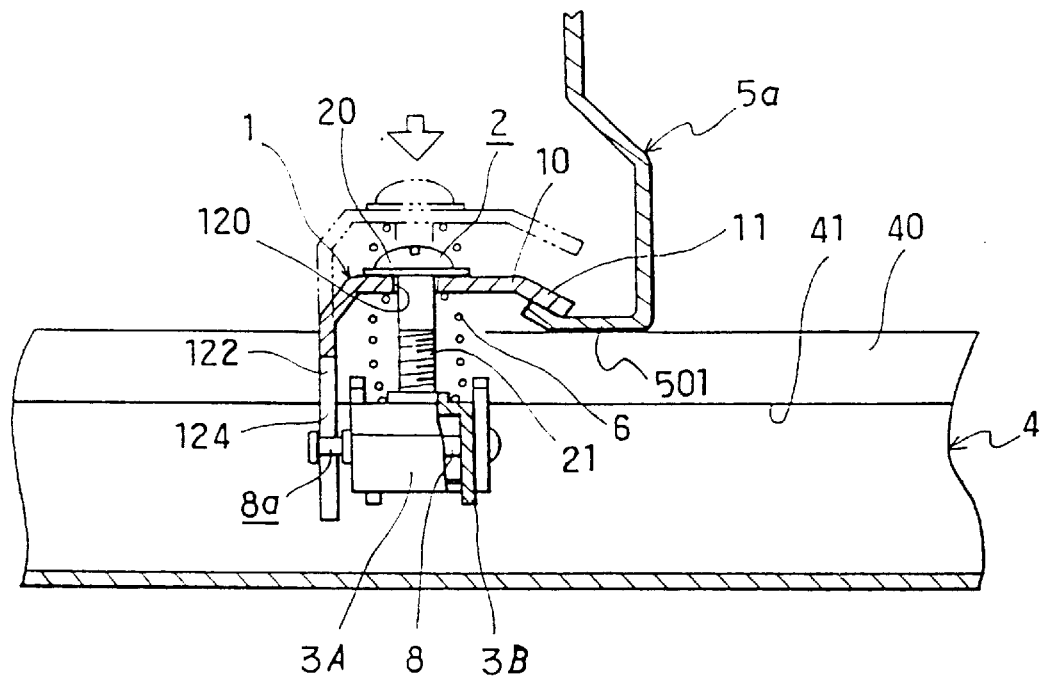
FIG. 19 is a side view, partly broken away, of a fixture according to the present invention wherein a main girder is permanently secured from inside.
Figure 20:
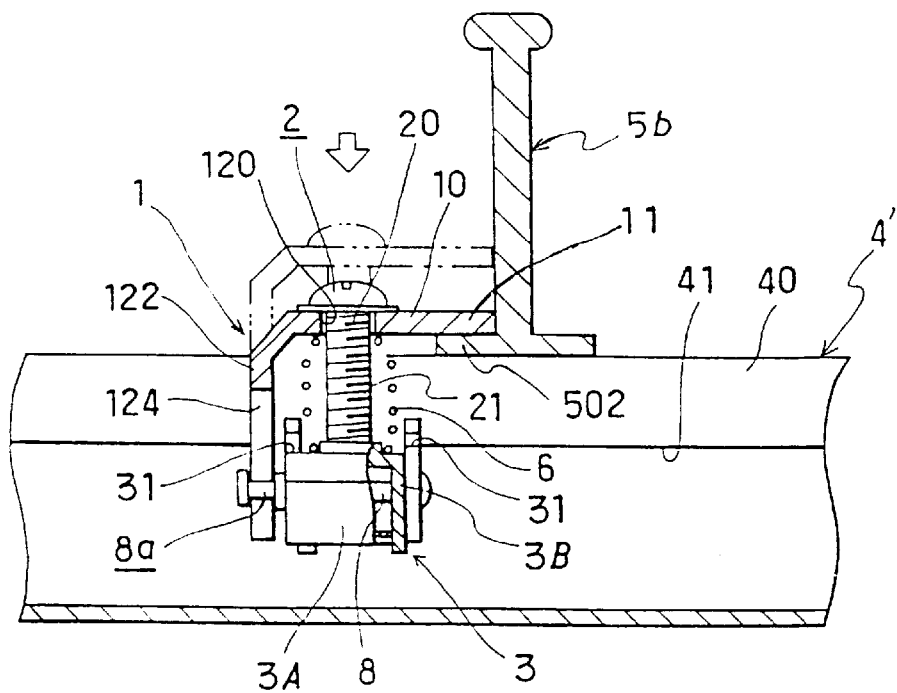
FIG. 20 is a side view, partly broken away, of a fixture according to the present invention wherein a small girder is permanently secured.
Figure 21:
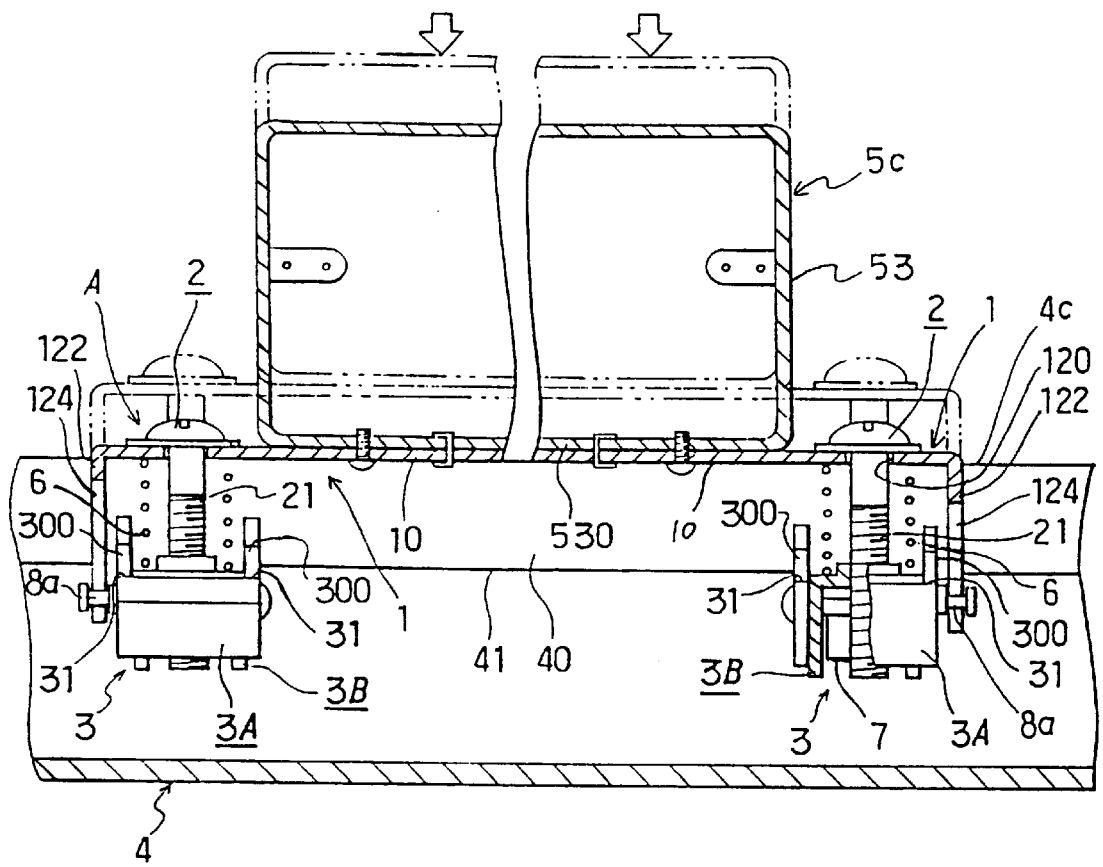
FIG. 21 is a side view, partly broken away, of a fixture for securing an outlet box according to the present invention.

FIG. 19 shows an embodiment of the present invention (hereinafter, referred to as an "inside embodiment") wherein fixtures according to the inside embodiment are attached to the inner sides of the rack 5a to retain the rack against vibration. Also, FIG. 20 shows an embodiment of the present invention (hereinafter, referred to as a "small girder related embodiment") wherein fixture according to the small girder related embodiment is used to secure the small girder 5b to the channel rail 4' of the rack 5a. FIG. 21 shows an embodiment of the present invention (hereinafter, referred to as an "outlet related embodiment") wherein fixtures according to the outlet related embodiment are used to secure an outlet box 5c.

Each of the embodiments will now be described in detail.

(Channel rail)

Figure 4:
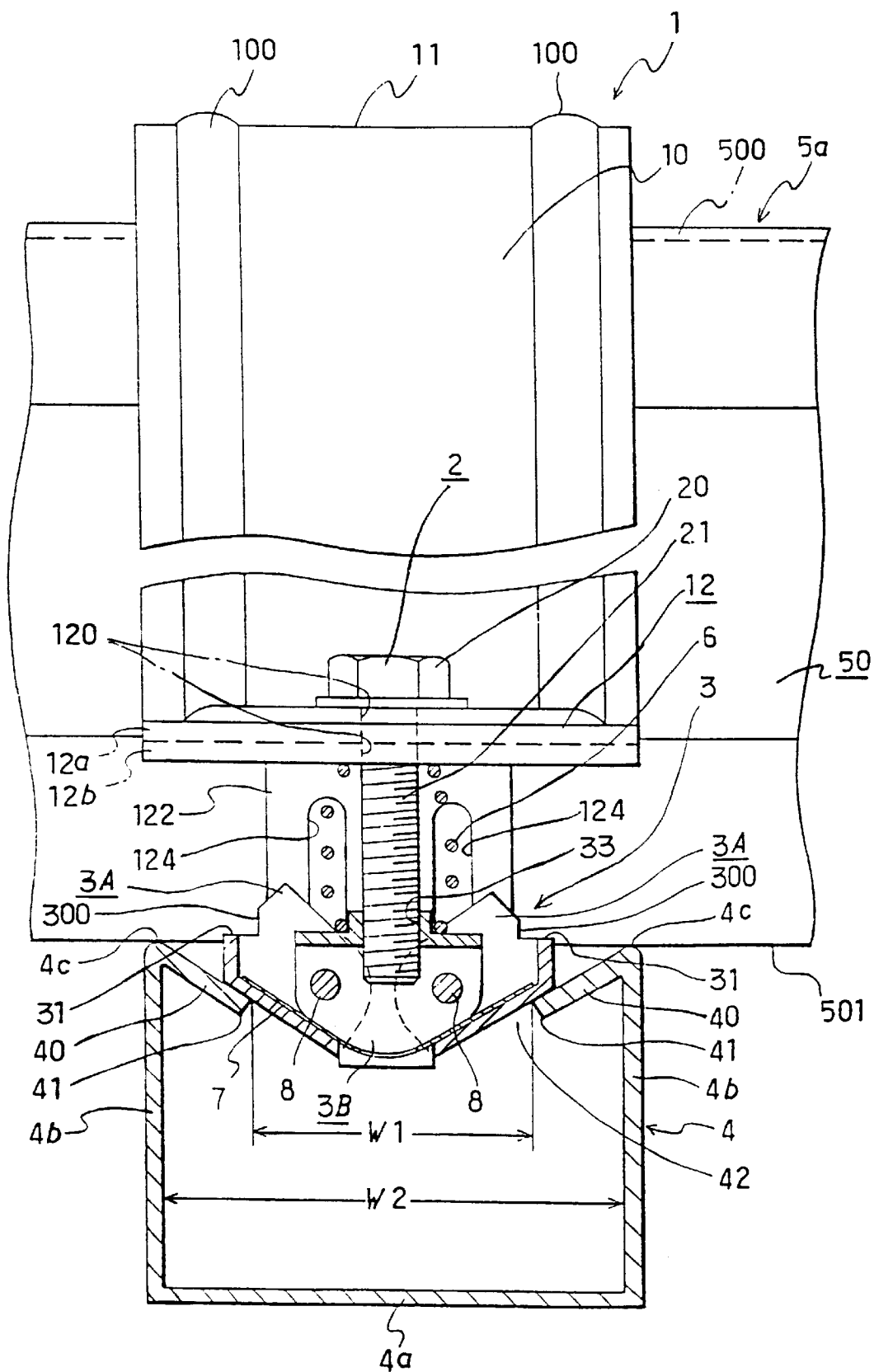
FIG. 4 is a front view, partly broken away, of a first embodiment of the present invention wherein a rack is secured.

As shown in FIG. 4, the channel rail 4 includes a web 4a, and a pair of opposite side walls 4b, 4b. A pair of channel flanges 40, 40 extend inwardly from the upper ends 4c, 4c of the side walls 4b, 4b and collectively define an channel inlet 42. The channel inlet 42 has a width W1 less than the distance W2 between the side walls 4b, 4b.

In FIG. 4, the channel flanges 40, 40 of the channel rail 4 are inclined downward. However, the sectional shape of the channel rail 4 is not limited thereto. As shown in FIG. 12, the channel flanges 40, 40 may be turned vertically downward. Although not shown, the channel flanges may alternatively extend in a horizontal direction. Also, the channel rail may take any other sectional shapes.

(Overall Structure of Fixture)

In the first rack and cable related embodiments, a fixture A comprises a fixture body 1, a bolt 2 extending through the fixture body 1 and having a shank 21, a clamp 3 threadedly engaged with the shank 21 of the bolt 2, and a retainer 6 adapted to limit the position of the clamp 3 in the height direction after the clamp 3 has been mounted to the fixture body 1. In these embodiments, the retainer 6 is in the form of a resilient member and disposed between the clamp 3 and the fixture body 1 to urge the clamp 3 away from the fixture body.

In the second rack and cable related embodiments, a reinforcement plate 13 is additionally employed to better withstand a clamping torque as shown in FIGS. 8 and 15. The reinforcement plate 13 needs not be employed in the case that the fixture body 1 has a sufficient strength, or a large force is not required to secure the elements.

In the third rack and cable related embodiments, an auxiliary fixture body 1' is used to better withstand a clamping torque as shown in FIGS. 10 and 16 and associated with a clamp guide as will be described later.

(Fixture Body 1 and Related Components)

In either embodiment, the fixture body 1 is made of a ferrous metal, a nonferrous metal such as aluminum and aluminum-base alloy, a nonmetal such as plastic, or a composite material such as metal/nonmetal composite.

Figure 5:
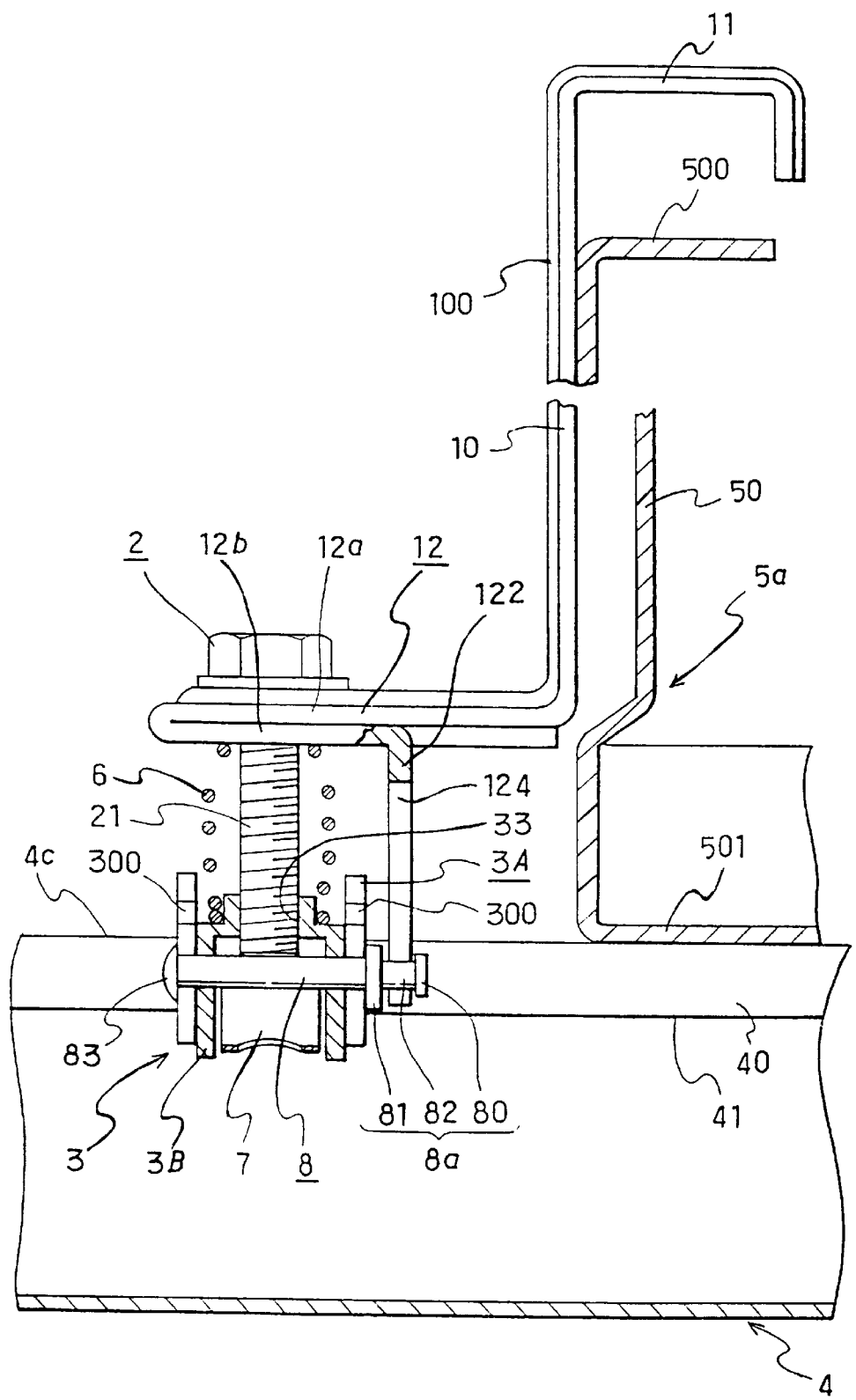
FIG. 5 is a side view, partly broken away, of the first embodiment.

In the first rack related embodiment, the fixture body 1 includes a main portion 10 for abutting engagement with the rail 50 of the rack 5a, and a clamping portion 11 bent from the upper end of the main portion 10 for clamping engagement with the upper flange 500 of the rack 5a as shown in FIG. 5. A seating portion 12 is bent from the lower end of the main portion 10 and placed on the channel rail 4. Preferably, ribs 100 extend from the clamping portion 11 to the seating portion 12.

Figure 7:
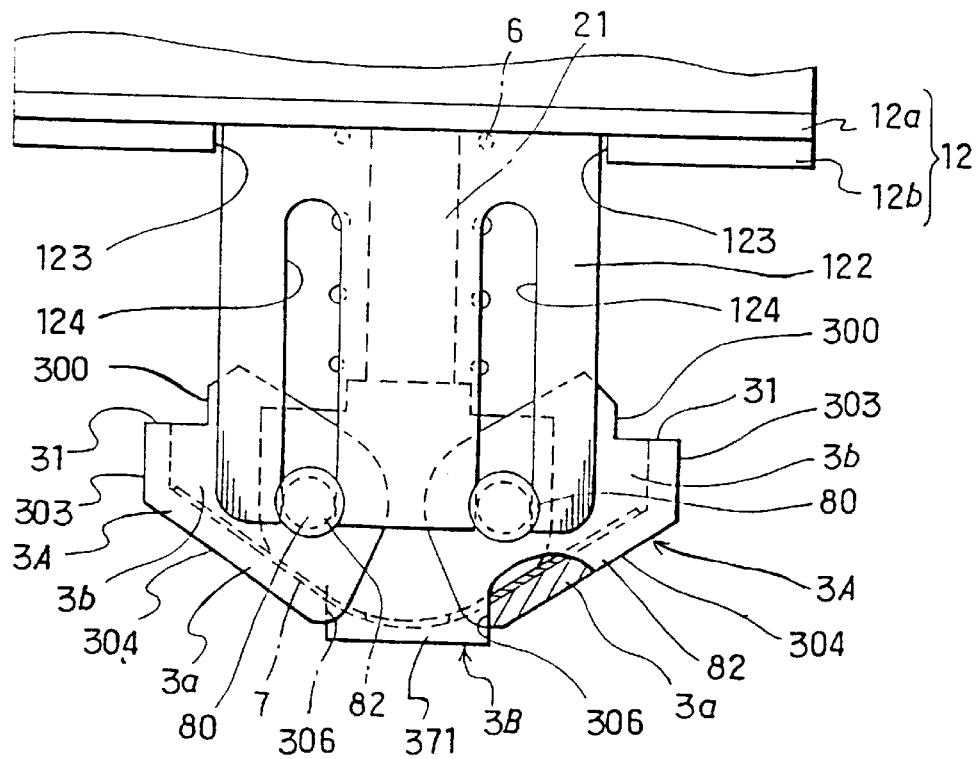
FIG. 7 is a rear view, partly broken away, of the first embodiment.

In this embodiment, the seating portion 12 has two plates arranged one above the other as shown in FIGS. 4, 5 and 7. Specifically, the seating portion 12 includes an upper plate 12a and a lower plate 12b bent from the front end of the upper plate 12a. A through opening 120' is formed in the upper plate 12a and the lower plate 12b to receive the shank 21 of the bolt 2.

The lower plate 12b has recesses 123, 123. A guide plate 122 is bent from the lower plate 12b at an angle of approximately 90 degrees and may or may not extend through the recesses 123, 123. The guide plate 122 extends downwardly from the lower plate and has a width so that the guide plate 122 may be inserted into the channel inlet 42 of the channel rail 4. A guide slot (in this embodiment, a plurality of guide slots) 124, 124 extends from the lower end of the guide plate 122 and has a given height.

In the second rack related embodiment shown in FIG. 8, a fixture body 1 has a seating portion 12 in the form of a single plate. A guide plate 122 extends downwardly from the front end of the seating portion 12 and has guide slots 124, 124 identical to those used in the first rack related embodiment. The seating portion 12 has a through opening 120. A reinforcement plate 13 has a through opening 130 in alignment with the opening 120 and is superimposed on the seating portion 12.

In the third rack related embodiment shown in FIG. 10, a fixture body 1 has a seating portion 12 in the form of a single plate. The seating portion 12 has a straight front end rather than a bent front end. As shown in FIGS. 9 and 10, an auxiliary fixture body 1' includes a plate 121 superimposed on the seating portion 12, and a guide plate 122 bent downwardly from the front end of the plate 121. The seating portion 12 has a through opening. The plate 121 has a through opening 120' in alignment with the through opening 120 of the seating portion 12. The guide plate 122 has guide slots 124, 124 identical to those used in the first rack related embodiment.

Next, in the first cable related embodiment shown in FIG. 14, a fixture body 1 includes a clamping portion 11 having a shape substantially complimentary to the sectional shape of the cable or the like B, and a seating portion 12 integral with and extending forwardly from the lower end of the clamping portion 11. In this embodiment, the seating portion 12 has two plates arranged one above the other, an upper plate 12a and a lower plate 12b bent from the upper plate 12a. A through opening 120 extends through the upper and lower plates to receive the shank 21 of the bolt 2.

A guide plate 122 is turned downwardly from the lower plate 12b. The guide plate 122 has guide slots 124, 124 identical to those previously described. The guide plate 122 must be located outside of the region of the clamping portion 11.

Preferably, the clamping portion 11 has a size such that it is fit around one half of the circumference of the cable or the like B. One end of the clamping portion 11 opposite the seating portion may be flush with or substantially flush with the seating portion 12. In this embodiment, the clamping portion 11 has an extension 14 in order to facilitate holding of the cable or the like B and insertion of the guide plate 122 into the channel rail 4. The extension extends from one end of the clamping portion at a location flush with or slightly above the seating portion 12 and terminates below the seating portion 12. The extension 14 has a size so that it may be inserted into the channel inlet 42 of the channel rail 4. Preferably, the extension 14 is slightly inclined and has an outwardly bent guide portion 1141 at its lower end.

In the second cable related embodiment shown in FIG. 15, a fixture body 1 has a seating portion 12. A guide plate 122 extends downwardly from the front end of the seating portion 12 and has guide slots 124, 124 identical to those used in the first rack related embodiment.

In the third cable related embodiment shown in FIG. 16, a fixture body 1 has a seating portion 12 in the form of a single plate. The seating portion has a straight front end rather than a bent front end. An auxiliary fixture body 1' is superimposed on the seating portion 12 and is identical in structure to that shown in FIG. 9. Parts which correspond to those shown in FIGS. 9 and 10 are given like reference numerals and will not be described herein.

In the fourth cable related embodiment shown in FIG. 18, a fixture body 1 includes a clamping portion 11. The clamping portion 11 has opposite curved portions 11a, 11a, and a straight portion 11b extending between the curved portions 11a, 11a. Two projections 11d, 11d extend from opposite lateral sides of the straight portion 11b and have concaved or arcuate surfaces 11c, 11c.

The two projections 11d, 11d are downwardly bent at right angles to the body and serve as a pair of spacers. The arcuate surfaces 11c, 11c of the projections and the curved portions 11a jointly constitute a clamp and have a shape corresponding to the sectional shape of the cable or the like B. Any number of projections 11d may be employed. For example, two projections may be arranged along the length of the straight portion 11b to secure three conduits in position. Four conduits may be secured if three projections are employed.

Seating portions 12, 12 are located below and extend forwardly from opposite sides of the clamping portion 11. Guide plates 122 are bent from the respective seating portions 12, 12 and have guide slots 124, 124 similar to those described earlier. This fourth cable related embodiment is illustrative only. It may include a reinforcement plate or auxiliary fixture body, or may be identical in structure to the first cable related embodiment.

In the inside embodiment shown in FIG. 19, a fixture body 1 is in the form of a plate and has a main portion 10 as a seating portion, and a clamping portion 11 formed in the rear end of the main portion 10 and contacted with the flange 501 of the main girder 5a. The main portion 10 has a through opening 120 intermediate its width. In this embodiment, the clamping portion 11 extends in an oblique direction. Also, in this embodiment, a guide plate 122 is turned from the front end of the main portion 10 and has guide slots 124, 124.

In the small girder related embodiment shown in FIG. 20, a fixture body 1 is in the form of a plate and has a main portion 10 as a seating portion, and a clamping portion 11 formed in the rear end of the main portion 10 and contacted with the girder seat 502 of the small girder 5b. The main portion 10 has a through opening 120. In this embodiment, the clamping portion 11 extends in a horizontal direction, but may extend in an oblique direction as in the inside embodiment. In this embodiment, a guide plate 122 is turned from the front end of the main portion 10 and has guide slots 124, 124.

In the outlet related embodiment shown in FIG. 21, a fixture body 1 has a main portion 10 in the form of a strip plate which is bolted, welded or otherwise secured to the lower surface of the outlet box 5c. The main portion 10 serves as a seating portion, extends outwardly from opposite longitudinal ends of the outlet box 5c, and has a through opening 120 intermediate its width as in the previous embodiment. Also, a guide plate 122 is turned from the front end of the main portion 10 and has guide slots 124, 124. The fixture body 1 may be composed of two discrete members and separated before a cable-receiving opening 530.

The inside embodiment, the small girder related embodiment and the outlet related embodiment are illustrative only. They may, of course, include a rear guide plate 122 as shown best in FIG. 5, a reinforcement plate as shown best in FIG. 8, and an auxiliary fixture body as shown best in FIGS. 9 and 10.

In either embodiment, the guide plate 122 has a width equal to or less than that of the channel inlet 42 of the channel rail 4. The guide plate 122 has a lower end flush with or above the pivot pins and has a length such that the guide plate 122 may not reach the bottom of the channel rail when the seating portion 11 or the main portion 10 is seated on the channel rail 4.

The bolt 2 may take any form provided that it includes the head 20 and the shank 21. The bolt 2 may be of the type which is subject to fracture when torque reaches a given level.

(Clamp 3)

Figure 22:
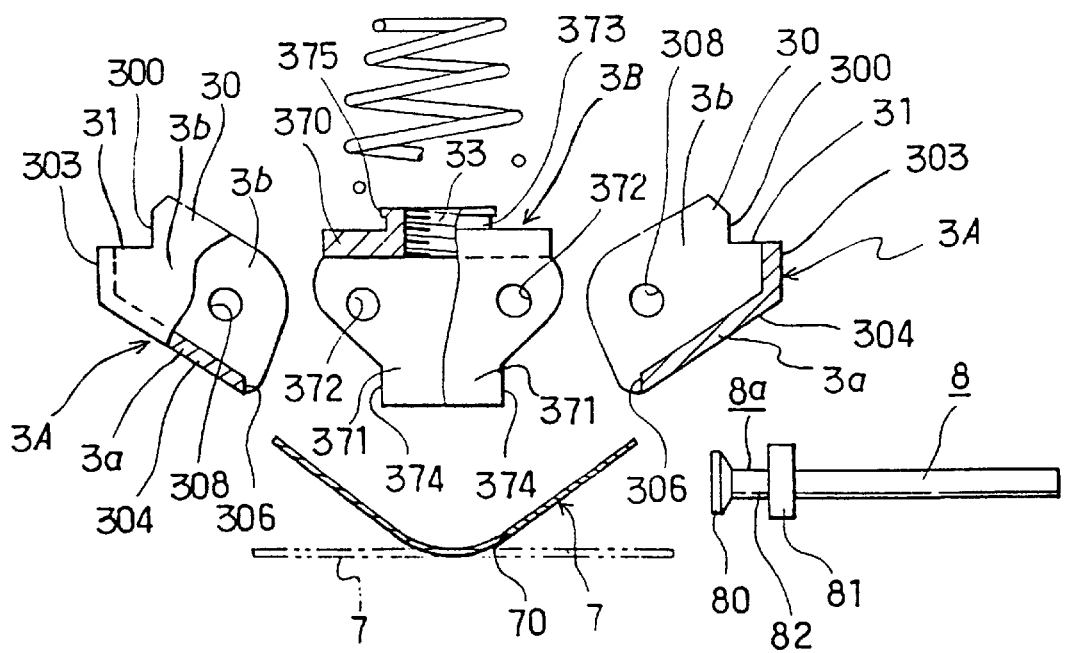
FIG. 22 is an exploded front view, partly broken away, of a clamp for use in the present invention.

Referring to FIGS. 3, 7 and 22, the clamp 3 generally includes a pair of right and left clamping elements 3A, 3A, and a nut 3B into which the shank 21 is threaded through the through opening 120. The right and left clamping elements 3A, 3A are supported by the nut 3B through the pivot pins 8, 8 and are openable and closable when they are pivoted at an angle of approximately 90 degrees about an axis which extends in a direction transverse to vertical axis (axis of the bolt 2).

The clamping elements 3A, 3A and the nut 3B may be made of any suitable materials including a ferrous metal, a nonferrous metal such as aluminum and aluminum-base alloy, a nonmetal such as plastic, or a metal/nonmetal composite. The clamping elements 3A, 3A and the nut 3B may be made by pressing, forging, injection molding or other processes.

The clamping elements 3A, 3A of the clamp 3 are normally opened to a maximum extent. The clamp 3 includes a return element 7 in order to insure that the clamping elements 3A, 3A are returned to their fully opened condition from a closed condition.

Figure 6:
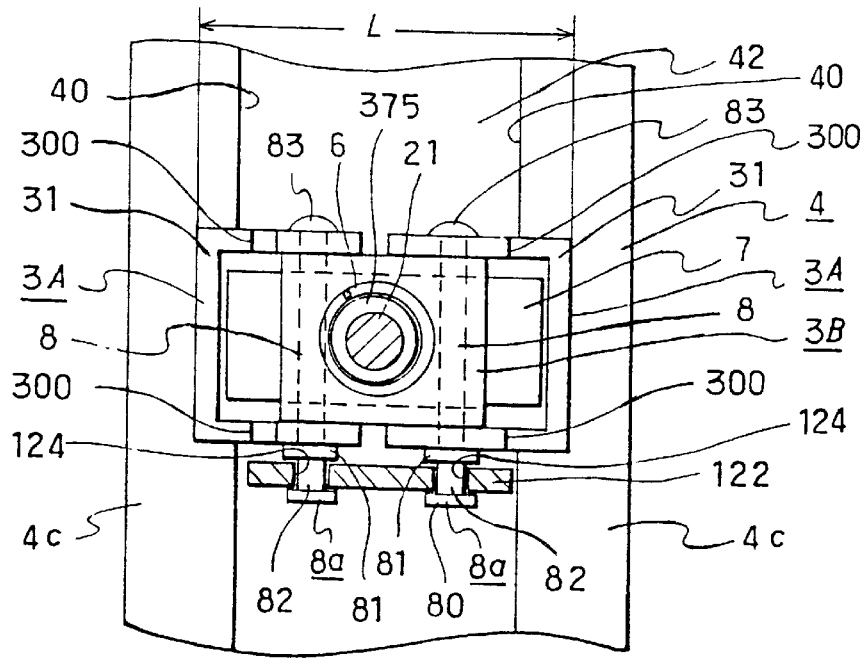
FIG. 6 is a transverse sectional view of the first embodiment.

The distance between the outer ends of the clamping elements 3A, 3A in its fully opened condition corresponds to a length L of the clamp 3 (see FIG. 6). The length L is greater than the width W1 of the channel inlet of the channel rail 4 and is less than the distance W2 between the channel flanges of the channel rail 4. For the purpose of convenience, the width of the clamp 3 is less than that of the channel inlet 42. The clamp 3 should be suspended at a location outside of the proximal end of the clamping portion 11 so that the clamp 3 does not interfere when the clamping portion 11 of the fixture body 1 is brought into contact with the flanges 500, 501 or the girder seat 502.

As shown in FIGS. 6, 7 and 22, each of the clamping elements 3A, 3A includes a web 3a and two flanges 3b, 3b extending upwardly from opposite sides of the web 3a and has a C-shaped section. The flange and the web jointly provide a clamping surface 31 in the upper outer end of each of the clamping elements 3A, 3A. The clamping surface 31 is forced into contact with a lower surface 41 of the channel flange 40 of the channel rail 4.

As shown in FIG. 22, a projection 30 is an extension of each of the flanges 3b, 3b and extends upwardly from the clamping portion 31. The projections 30 have guide surfaces 300, 300 in a face-to-face relation to the channel flanges 40, 40 of the channel rail 4.

The nut 3B includes a central threaded hole 33 adapted to receive the shank 21 of the bolt 2. The nut 3B has a width substantially equal to the distance between the clamping elements 3A, 3A. As shown in FIGS. 4 and 6, the clamping elements 3A, 3A are symmetrically fit over the nut 3B through their rear openings and journaled by the pivot pins 8, 8.

As a feature of the present invention, a plurality of or a single protrusion 8a extends from one side of the nut 3B of the clamp 3 and is received within the guide slot 124 of the guide plate 122.

In a preferred embodiment, the protrusion 8a is integral with the pivot pin 8. Specifically, the pivot pin 8 has a length such that it extends outwardly from each of the clamping elements 3A, 3A. The protrusion 8a is formed at the free end of the pivot pin 8.

In this example, each of the pivot pins 8, 8 has an enlarged stopper 80 at its free end. The pivot pin 8 also has a head (divider) 81 spaced from the stopper 80 by a distance substantially equal to the thickness of the guide plate 122. A guide pin 82 extends between the stopper 80 and the head 81.

To mount the clamping elements 3A, 3A to the nut 3B, each of the pivot pins 8, 8 is inserted into the nut 3B until the head 81 is brought into contact with one of the flanges of each clamping element. One end of the pivot pin 8 which extends from the other flange is then caulked to form another, opposite head. The guide slot 124 is so formed as to align with the guide pin 82 and has a width substantially equal to that of the guide pin 82.

According to the present invention, the protrusion 8a is not necessarily integral with each of the pivot pins 8, 8. It may be a discrete member. Referring specifically to FIGS. 11-A and 11-B, the pivot pins 8, 8 only provide a connection between the nut 3B and the clamping elements 3A, 3A. A protrusion 8a is fixed to the side wall of the nut between the right and left clamping elements 3A, 3A and includes a stopper 80 and a guide pin 82. In this case, the protrusion 8a is in the form of a headed pin. The guide pin 82 has a bent rear end welded to the side wall of the nut. Alternatively, the guide pin may be threaded into or caulked to the side wall of the nut. To this end, the guide plate 122 has a single guide slot 124 intermediate its width. The guide slot 124 has a width substantially equal to the diameter of the guide pin 82.

According to the present invention, the embodiment of FIG. 11 may be combined with the embodiment of FIGS. 5 to 8. Specifically, there may be employed right and left protrusions formed in the pivot pins 8, 8 and a separate, central protrusion. In such a case, the guide plate has three guide slots.

The projection 8a, in two different forms, of the clamping element 3 thus constructed is commonly used in each embodiment. Accordingly, corresponding parts used in the other embodiments are given like reference numerals and will not be described.

The clamp 3 will be described in more detail. The projections 30, 30 of the clamping elements 3A, 3A are rearwardly inclined at a given angle since the height of the projections has no effect on their function. However, a portion of each projection 30 above the guide surface 300 may extend on a straight line. To facilitate closing of the clamping elements 3A, 3A, the projections 30, 30 are inclined downward from their top toward the bottom when the clamping elements are in their opened condition.

As shown in FIGS. 7 and 22, the web 3a of each of the clamping elements 3A, 3A has an inclined surface 304 below the clamping portion 31. The inclined surface 304 extends parallel to the downwardly inclined surface of the projection 30 or is inclined at an angle near the angle of the downwardly inclined surface of the projection 30. This facilitates closing of the clamping elements 3A, 3A after they are contacted with the top wall of the channel rail 4. Each of the webs 3a, 3a has a vertical surface 303 extending from the upper end of the inclined surface 304 and terminating at the clamping surface 31. The inclined surface 304 and the vertical surface 303 may be curved rather than flat.

The inclined surface 304 of the web 3a has a lower end 306 which cooperates with the nut 3B to limit the extent of opening of the clamping elements. To this end, the lower end 306 terminates shortly before the rear end of each of the flanges 3b, 3b as shown in FIG. 22.

The nut 3B has a rectangular head 370 as viewed in plan, and legs 371. The legs 371 extend from the head 370 and are narrower in a lateral direction. The head 370 has an inclined or arcuate lower surface. The lower surface is inclined at an angle substantially equal to that of the inclined surface 304 of the web 3a.

As shown in FIG. 22, the head 370 of the nut 3B has two transverse holes 372, 372 at a location outside of the threaded hole 33. The flanges 3b, 3b have openings 308, 308 at predetermined locations. To provide a connection between the clamping elements 3A, 3A and the nut 3B, the openings 308, 308 are aligned with the transverse holes 372, 372. The pivot pins 8, 8 are then inserted through the openings and the transverse holes 372, 372.

In this embodiment, the nut 3B has an inverted C-shaped section. The threaded hole 33 is defined by the wall of the head 370 and the boss 373 formed in the head 370.

The lower end of the leg 371, when assembled as shown in FIG. 7, terminates at or extends below the lower end of each of the clamping elements 3A, 3A. The lower end 306 of the web is brought into contact with a side 374 of the leg 371 when the clamping elements 3A, 3A are opened to a maximum extent. This blocks further opening of the clamping elements 3A, 3A and at the same time, accommodates load when a strong clamping force is applied to the clamping surfaces 31, 31.

(Return Element 7)

To positively provide a return force, the return element 7 is preferably made of a resilient material such as springs and rubber.

The springs include a leaf spring. As shown in FIG. 22, the leaf spring is bent to a V-shape. The leaf spring is mounted from the lower surface of the leg 371 of the nut 3B and contacted with the inclined inner surfaces of the webs 3a, 3a of the right and left clamping elements 3A, 3A. In this embodiment, the nut 3B has a C-shaped section to provide a pair of legs 371, 371. Advantageously, the legs 371, 371 serve as stopper walls.

Preferably, the leaf spring includes a central opening 70 sized to allow the passing of the shank 21 of the bolt 2. Advantageously, such a leaf spring is simple in structure and is readily mounted to the clamp 3.

A wire spring may alternatively be employed as shown in FIGS. 24-A and 24-B.

FIG. 24-A shows a tension spring which has opposite ends secured to the flanges at a location below the pivot pins 8, 8 so as to pull the lower region of each of the clamping elements 3A, 3A. FIG. 24-B shows a helical tension spring which has a few turns at its center. Opposite ends of the helical tension spring are secured to the flanges at a location above the pivot pins 8, 8.

The tension spring may alternatively be located below the nut 3B and extend between the webs of the right and left clamping elements 3A, 3A for securing purposes.

In lieu of the return element 7, a clamping region of the clamping elements 3A, 3A may have a greater mass. To this end, a weight made of lead or other materials may be attached to the clamping region. Alternatively, the inclined upper end (vertical surface) of the web 3b may have a greater thickness.

(Retainer 6)

The retainer basically functions to regulate the effective length of the bolt 2 and to allow the clamping elements 3A, 3A to be smoothly moved toward each other against the action of the return element 7, with the clamping elements being spaced a predetermined distance away from the seating portion 12 or the main portion of the fixture body 1, when the clamp 3 is forced into the channel rail 4.

A resilient element is normally used as the retainer 6. The resilient element is disposed between the lower surface of the seating portion 12 or the main portion 10 and the head of the nut 3B to urge the nut 3B away from the seating portion. As such, the bolt 2 can positively be held in the seating portion 12 or the main portion 10 if a lifting force is applied to the clamp 3. Additionally, the retainer 6 is effective to prevent the bolt 2 from being loosened when it is being secured and after it has been secured.

The resilient element includes a rubber or plastic tube and bellows, but is preferably in the form of a coil spring. For better pressure offset, the coil spring is preferably tapered or takes a barrel shape with the upper and lower ends being less in diameter than the middle portion as shown in FIG. 4.

The resilient element may be separated from the clamp 3. However, the resilient element is preferably incorporated into the clamp to form a clamp assembly. To this end, a boss 373 illustratively has a stopper or projection 375 on its outer periphery as shown in FIG. 22. By this arrangement, the front end of the resilient member is moved over the projection 375 while the resilient member is rotated in a clockwise direction. The front end of the resilient member is then seated on the upper surface of the head of the nut below the boss 373. A portion of the resilient element slightly rearwardly of its front end is brought into engagement with the underside of the projection 375 to integrate the resilient element and the clamp 3 together.

The retainer 6 may alternatively be in the form of a metallic or plastic split ring 60 or similar elements as the case may be. In such a case, the split ring 60 is laterally fit to the shank 21 immediately below the main portion 10 or the seating portion 12 after the shank 21 has been inserted through the main portion 10 or the seating portion 12 of the fixture body 1. The spring ring has on its inner periphery an internal thread with one or two pitches.

The retainer may also be in the form of a pin such as a split pin. Still alternatively, a resistive element such as a relatively week adhesive or resin may be used to fill the space between the shank 21 and the through opening 120 or the space between the bolt head 20 and the upper surface of the main portion 10, seating portion 12 or bent portion 12'. The resistive element is subject to fracture when the bolt is rotated.

Several embodiments of the present invention are illustrated in the drawings, but the present invention is not limited thereto.

Referring to FIGS. 10 and 16, the plate 121 is superimposed on the seating portion 12. Alternatively, the plate 121 may be attached to the lower surface of the seating portion 12.

The clamping surface 31 of each of the clamping elements 3A, 3A does not necessarily extend in a horizontal direction. It may be inclined at an angle corresponding to the angle of inclination of the channel flanges 40, 40 in the case that the channel flanges 40, 40 are inclined.

The nut 3B may be solid in section. In such a case, a groove (not shown) may be formed between the leg 371 and the head 370 to allow the passing of the return element 7 below the leg 371 of the nut 3B. The groove should have a width corresponding to that of the return element 7.

Where the protrusion 8a is not formed as part of each of the pivot pins 8, 8, a guide groove or recess may be formed in the side wall of the nut 3B to receive the protrusion 8a. In such a case, a pin may be secured to the guide plate 122.

Reference will next be made to the manner of use and operation of the embodiments of the present invention.

(Assembly)

Where the retainer 6 is a resilient element, and the nut 3B is provided with the projection 375, the retainer 6 is connected to the nut 3B through the projection 375 to form one assembly.

Figure 23:
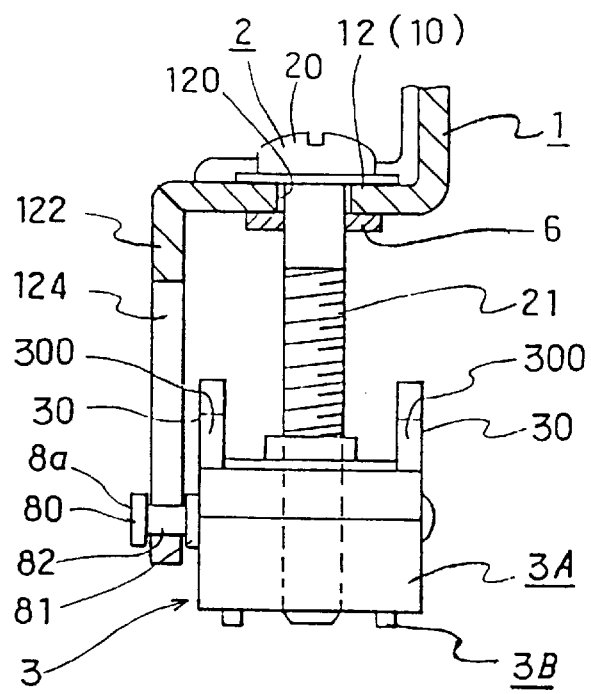
FIG. 23 is a side view, partly broken away, of a modified retainer.

The retainer 6 is then brought into alignment with the through opening 120 of the main portion 10 or the seating portion 12 of the fixture body 1. The guide pin 82 of the protrusion 8a which extends from the clamp 3 is positioned within the guide slot 124 of the guide plate 122. In this state, the shank of the bolt 2 is inserted through the through opening 120 into the threaded hole 33 of the nut 3B. The bolt 2 is rotated to compress the retainer 6. The bolt 2 continued to be rotated until a desired effective length of the shank is obtained to exert a predetermined lifting force on the clamp 3. As a result, the clamp 3 is lifted to cause the guide pin 82 of the protrusion 8a to be received in the guide slot 124.

Where the nut 3B is not formed with the projection 375, the retainer 6 is a discrete member. To this end, the lower end of the retainer 6 is fit around the boss 373 of the nut 3B. In this state, the bolt 2 is brought into alignment with the through opening 120 of the main portion 10 or the seating portion 12. The rest of the operation is the same as above.

Where the retainer 6 is configured as shown FIG. 23, the retainer is fit around the shank 21 at a location below the main portion 10 or the seating portion 12 after the shank 21 has been threaded into the clamp 3 through the main portion 10 or the seating portion 12.

In either case, the head 81 and the stopper 80 exist at opposite ends of the guide pin 82 in the clamp 3. These members have a large diameter and are located adjacent to the surface of the guide plate 122. As such, the clamp 3 can automatically be positioned in parallel to the guide plate 122 and spaced a fixed distance away from the guide plate 122. Under the circumstances, the clamp 3 is free from rotation and vibration if the clamp 3 is contacted by hands or other objects, and the guide plate is constantly oriented at right angles to the guide slot 42 of the channel inlet 4. Also, the bolt 2 will in no way be rotated and will have a required effective length. This results in ready assembly.

When the guide plate 122 is dependent behind the bolt as shown in FIGS. 5 and 14, it is possible to instantaneously visually determine as to whether or not preliminary mounting is properly effected.

(Preliminary Mounting)

Reference will now be made to preliminary mounting of electric line parts.

To preliminarily mount the rack 5a to the channel rail 4 from outside, the rack 5a is first placed on and extends across the channel rails 4. As shown best in FIG. 5, the fixture body 1 is positioned so that the main portion 10 extends along the outer surface of the rack 5a, and the clamping portion 11 is located above the bent portion 500. The fixture body 1 is then pressed downward.

To preliminarily mount the cable or the like B, the cable or the like B is first placed on and extends across the channel rails 4. As shown best in FIG. 14, the fixture body 1 is positioned so that the extension 14 is located adjacent to the cable or the like B, and the clamping portion 11 is located above the cable or the like B. The fixture body 1 is then pressed downward. Referring to FIG. 18, the fixture body 1 is pressed downward after the projection 11d is located above the cable or the like B. The fixture body 1 is then pressed downward.

To clamp the rack 5a from inside so as to retain it against vibration, the fixture body 1 is first held such that the clamping portion 11 is located right above the bent portion of the rack 5a as shown by the imaginary line in FIG. 9. The fixture body 1 is then pressed downward.

To preliminarily mount the small girder, as a transverse beam for the rack 5a, to the channel rail 4', the fixture body 1 is first held right above the girder seat 502 of the small girder 5b placed on the channel rail 4', as shown by the imaginary line in FIG. 20. The fixture body 1 is then pressed downward.

To preliminarily mount the outlet box 5c to the channel rail or duct 4, the outlet box 5c is located right above the channel rail 4 and then pressed against the channel rail 4.

As shown in FIG. 4, the bottoms or inclined surfaces 304, 304 of the clamping elements 3A, 3A in the clamp 3 which is suspended from the seating portion 12 or the main portion 10 are then brought into contact with the top walls of the channel flanges 40, 40. Also, the lower end of the guide plate 122 faces against the opening or is slightly inserted into the channel inlet.

Further downward movement of the fixture body 1 causes the guide plate 122 together with the clamp 3 to be inserted into the channel inlet 42. The inclined surfaces 304, 304 (web 3a, 3a) are then pressed laterally by the channel flanges 40, 40.

As a result, the right and left clamping elements 3A, 3A are inwardly pivoted about the pivot pins 8, 8 against the action of the return element 7, 7 as shown in FIG. 12-A. The entire assembly is lowered while the clamping elements are being moved toward each other with the inclined surfaces 304, 304 in contact with the channel flanges 40, 40. At this time, the clamp 3 and the bolt 2 will in no way be lifted since the biasing force of the retainer 6 is greater than that of the return element 7, 7. Accordingly, the clamping elements 3A, 3A can smoothly and positively be moved toward each other.

When the fixture body 1 is further pressed downward, the seating portion 12 or the main portion 10 is moved closer to the top walls 4c, 4c of the channel rail. The clamping elements 3A, 3A are no longer clamped between the channel flanges 40, 40 when the inclined surfaces 304, 304 of the right and left clamping elements 3A, 3A are moved beyond the lower ends of the channel flanges 40, 40.

As a result, the return element 7, 7 causes the clamping elements 3A, 3A to be outwardly pivoted about the pivot pins 8, 8 as shown in FIG. 12-B. Then, the clamping portions 31, 31 are moved beyond the lower surfaces 41, 41 of the channel flanges 40, 40. At this time, the projections adjacent to the clamping surfaces 31, 31, when rotated, have a radius of curvature substantially the same as that of the clamping portions 31, 31. As such, the projections can smoothly be moved below the channel flanges 40, 40 of the channel rail 4 regardless of no matter how high the channel flanges 40, 40 are.

Immediately after the projections are moved beyond the channel flanges 40, 40, the clamping surfaces 31, 31 are held in a horizontal position under the influence of the return element 7. The guide surfaces 300, 300 are then spaced from or contacted with the channel flanges 40, 40. In the embodiment shown in FIG. 21, the right and left clamps are simultaneously operated in the same manner as thus far described.

Downward movement of the fixture body 1 is automatically stopped when the main portion 10 or the seating portion 12 of the fixture body 1 is brought into contact with the top of the channel rail 4. At this time, the clamp portion 11 is engaged with the bent portion 500 of the rack 5a, the outer surface of the cable or the line B or the seating portion 502 of the small girder 5b.

When the clamping elements 3A, 3A are outwardly rotated as explained earlier, the lower ends 306, 306 of the webs are brought into contact with the sides 374, 374 of the legs in the nut 3B, respectively, and the clamping elements 3A, 3A are held in their fully opened condition. At this time, the free ends of the pivot pins 8, 8 are fit within the guide slots 124, 124 of the guide plate 122. Thus, the clamping elements 3A, 3A are free from displacement and vibration in a lateral direction as well as in a to-and-fro direction if strong shock occurs.

If the guide surfaces 300, 300 are not contacted with the channel flanges 40, 40 as shown in FIG. 12-C, or if the projections are located fully below the lower surfaces of the channel flanges 40, 40 as shown in FIGS. 13-A and 17-B, the clamping portions 31, 31 can be positioned in a face-to-face relation to the lower surfaces 41, 41 of the channel flanges 40, 40. This completes preliminary mounting.

Under the circumstances, the fixture body 1 is in no way separated from the channel rail 4 since the clamping portions 31, 31, if the fixture body 1 is lifted, are brought into contact with the lower surfaces 41, 41 of the channel flanges 40, 40 to hold the clamping elements 3A, 3A in an open condition. By the same token, the fixture body 1 is not subject to lateral displacement since the lateral sides of the guide plate 122, if the fixture body 1 is moved in the lateral direction of the channel rail, are brought into contact with the channel flanges 40, 40.

On the other hand, the fixture body 1 is free to move along the channel inlet 42. At this time, the guide plate 122 is properly guided by its width. Also, the clamp 3 is free from displacement since the projection 8a is fit within the guide slot 124. As such, the clamping portions 31, 31 can be held at right angles to the lower surfaces 41, 41 of the channel flanges 40, 40 if the fixture body 1 is moved. It is possible to readily adjust the position of the fixture body 1 along the channel rail while the fixture body 1 is placed around the rack 5a, the cable or the like 5, or the small girder 5b. Referring to FIG. 21, the fixture body 1 is free to move since the fixture body 1 is integral with the outlet box 5c.

As thus far described, preliminary mounting does not require hanging of the fixture body 1 from the channel rail 4 and contact of the bolt 2. It is thus possible for any operator to extremely easily carry out operation without failure.

(Permanent Securement)

After the position of the fixture body 1 has been adjusted, the bolt 2 is rotated. This rotation can easily be effected without displacement of the bolt 2 since the nut 3B is pressed downward by the retainer 6 to positively seat the head of the bolt 2 on the seating portion 12 or the main portion 10.

As the bolt 2 is rotated, the shank 21 is inserted into the nut 3B to initiate upward movement of the clamp 3 against the biasing force of the retainer 6. Since the guide pin 82 of the protrusion 8a is fit within the guide slot 124 of the guide plate 122, the clamp 3 is in no way rotated with the shank 21, inclined in a vertical plane, or displaced in the width direction if the clamp 3 even as a whole is located below the channel flanges 40, 40. The clamp 3 can therefore be lifted while it is held exactly at right angles to the channel inlet 42 of the channel rail 4.

The guide surfaces 300, 300 face against the channel flanges 40, 40 while the clamping surfaces 31, 31 are in close contact with the lower surfaces 41, 41 of the channel flanges 40, 40. This allows for strong clamping. At this time, the lower ends 306, 306 of the webs of the clamping elements 3A, 3A are held against the sides 374, 374 of the legs of the nut 3B. Thus, the clamping elements 3A, 3A withstand a high degree of torque, are in no way unduly opened, and are positively held in position. Where the nut 3B has a C-shaped section, the clamping elements withstand a high degree of torque since load is applied in the thickness and vertical directions.

A high degree of clamping torque can be applied in the case that the seating portion 12 or the main portion 10 is composed of the upper plate 12a and the lower plate 12b, or the reinforcement plate 13 or the auxiliary fixture body 1' is superimposed on the seating portion 12 or the main portion 10 to increase the strength.

When the guide plate is dependent behind the bolt as shown in FIGS. 5 and 14, it is possible to visually determine as to whether or not clamping is proper.

In the first rack related embodiment, the second rack related embodiment and the third rack related embodiment, the rack 5a is strongly pressed against and permanently secured to the channel rail as shown in FIG. 13-B while the clamping portion 11 is fit around the rack 5a. In the first to fourth cable related embodiments, the cable or the like B is strongly pressed against the channel rail while the clamping portion 11 is closely fit around the cable or the like B as shown in FIG. 17-B.

In the inside embodiment, the rack 5a is strongly pressed against the channel rail by the clamping portion 11 as shown in FIG. 19. In the small girder related embodiment, the small girder 5b is strongly pressed against the channel rail by the clamping portion 11 as shown in FIG. 19. In the outlet related embodiment, the outlet box 5c is strongly pressed against the channel rail as shown in FIG. 20.

At this time, the retainer 6 is compressed between the seating portion 12 or the main portion 10 and the nut 3B and cooperates with the clamp 3 to strongly urge the bolt 2 in a downward direction. No loosening after securement occurs.

A fixture for installing electric lines according to the present invention can be used to secure other instruments, devices or components to a channel rail. Also, it can be used as a means to secure instruments, devices and components to an apertured plate.

We claim:

1. A clamp for clamping a fixture body to a channel rail, comprising a central nut; substantially horizontal pivot pins mounted to said nut; and a pair of right and left clamping elements pivotable about said pivot pins, each of said clamping elements including a clamping surface and a guide surfaces extending upwardly from a proximal end of said clamping surface, each of said horizontal pivot pins having a protrusion integral with a free end of each of said pivot pins and extending outwardly from one side of said nut so as to be oriented in a fixed relation to the fixture body, said protrusion of each of said horizontal pivot pins including a guide pin and a stopper at an end of said guide pin.

2. A clamp as defined in claim 1, wherein each of said pair of said clamping elements includes a web and flanges and defining a C-shaped section, said web having a lower end which is brought into contact with a lower portion of said nut so as to limit an extent of opening of said pair of said clamping elements.

3. A clamp as defined in claim 1, wherein said clamp has a return element for urging said pair of said clamping elements such that said clamping elements can constantly be opened.

4. A clamp as defined in claim 1, wherein said clamp has a return element for urging said pair of said clamping elements such that said clamping elements can constantly be opened, and a retainer for retaining said nut at a desired distance from a lower surface of the fixture body.

5. A clamp as defined in claim 4, wherein each of said pair of said clamping element includes a web and flanges, said return elements including a leaf spring extending below a lower part of said nut and between said web of said clamping elements.

6. A clamp as defined in claim 4, wherein said retainer has a coil spring, said nut having a projection, said retainer having a lower end secured onto said projection.

7. A clamp as defined in claim 1, wherein said pair of clamping elements in its fully opened condition corresponds to a length, said length being selected so as to be greater than a width of a channel inlet of the channel rail.

* * * * *